US008161132B1

(12) United States Patent
Zhao et al.

(10) Patent No.: US 8,161,132 B1
(45) Date of Patent: Apr. 17, 2012

(54) PACKET DATA NETWORK SPECIFIC ADDRESSING SOLUTIONS WITH NETWORK-BASED MOBILITY

(75) Inventors: Fan Zhao, San Jose, CA (US); Stefano Faccin, Fremont, CA (US); Ameya Damle, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 663 days.

(21) Appl. No.: 12/221,989

(22) Filed: Aug. 8, 2008

Related U.S. Application Data

(63) Continuation of application No. 12/186,016, filed on Aug. 5, 2008.

(60) Provisional application No. 60/954,123, filed on Aug. 6, 2007.

(51) Int. Cl.
*G06F 15/16* (2006.01)

(52) U.S. Cl. .......................... 709/218; 370/338; 709/228

(58) Field of Classification Search .................. 370/328, 370/338; 709/217, 218, 220, 222, 227, 228
See application file for complete search history.

(56) References Cited

U.S. PATENT DOCUMENTS

| | | | | |
|---|---|---|---|---|
| 7,860,978 | B2 * | 12/2010 | Oba et al. ....................... | 709/227 |
| 2007/0268919 | A1 * | 11/2007 | Sarikaya et al. ............... | 370/401 |
| 2008/0225760 | A1 * | 9/2008 | Iyer et al. ....................... | 370/310 |
| 2008/0256220 | A1 * | 10/2008 | Bachmann et al. ........... | 709/222 |
| 2008/0285518 | A1 * | 11/2008 | Dutta et al. ..................... | 370/331 |
| 2009/0016270 | A1 * | 1/2009 | Tsirtsis (Georgios) et al. .............................. | 370/328 |

OTHER PUBLICATIONS

Proxy Mobile IPv6 indication and discovery; draft-damic-netlmm-pmip6-ind-discover-01.txt; D. Damic, D. Premec, B. Patil, M. Sahasrabudhe, Nokia Siemens Networks; Jun. 19, 2007; 49 pages.
Proxy Mobile IPv6; draft-ietf-netlmm-proxymip6-01.txt; S. Gundavelli, K. Leung, Cisco; V. Devarapalli, Azaire Networks; K. Chowdhury, Starent Networks; B. Patil, Nokia Siemens Networks; Jun. 18, 2007; 44 pages.
Client Initiated Selection of Proxy Mobility; draft-krishnan-netlmm-pmip-sel-00; S. Krishnan, Ericson; Jun. 7, 2007; 45 pages.
Neighbor Discovery for IP Version 6 (IPv6); rfc2461.txt; T. Narten, IBM; E. Nordmark, Sun Microsystems; W. Simpson, Daydreamer; Dec. 1998; 93 pages.
IPv6 Stateless Address Autoconfiguration; rfc2462.txt; S. Thomson, Bellcore; T. Narten, IBM; Dec. 1998; 25 pages.
Dynamic Host Configuration Protocol; rfc2131.txt; R. Droms, Bucknell University; Mar. 1997; 45 pages.
Dynamic Host Configuration Protocol for IPv6 (DHCPv6); rfc3315. txt; R. Droms, Ed., Cisco; J. Bound, Hewlett Packard; B. Volz, Ericsson; T. Lemon, Nominum; C. Perkins, Nokia Research Center; M. Carney, Sun Microsystems; Jul. 2003; 101 pages.
IP Mobility Support for IPv4; rfc3344.txt; C Perkins, Ed., Nokia Research Center; Aug. 2002; 99 pages.
Mobility Support in IPv6; rfc3775.txt; D. Johnson, Rice University; C. Perkins, Nokia Research Center; J. Arkko, Ericsson; Jun. 2004; 165 pages.
ANSI/IEEE Std 802.11 First Edition 1999-00-00; Information technology—Telecommunications and information exchange between systems—Local and metropolitan area networks—Specific requirements—Part 11: Wireless LAN Medium Access Control (MAC) and Physical Layer (PHY) specifications; 529 pages.

* cited by examiner

*Primary Examiner* — Chi H Pham
*Assistant Examiner* — Weibin Huang

(57) ABSTRACT

A media access gateway includes a wireless network interface that establishes a wireless link with a wireless terminal. An address assignment module transmits N address assignment messages to the wireless terminal. The N address assignment messages include a plurality of address components and associate the plurality of address components with a plurality of packet data networks, where N is an integer greater than zero.

27 Claims, 18 Drawing Sheets

| Mobile Node | APN | LMA | PMIP Prefix |
|---|---|---|---|
| Terminal_ID | $APN_1$ | $LMA_1$ | Prefix 1 (if available) |
| | $APN_2$ | $LMA_2$ | Prefix 2 (if available) |
| | ... | | |
| ... | | | |

| APN | Service Identifiers |
|---|---|
| $APN_1$ | 8 (Push Email), 9 (Text Messaging) |
| $APN_2$ | 3 (VoIP) |
| $APN_3$ | 7 (Web Browsing) |

PACKET DATA NETWORK SPECIFIC ADDRESSING SOLUTIONS WITH NETWORK-BASED MOBILITY

CROSS-REFERENCE TO RELATED APPLICATIONS

This application is a continuation of U.S. patent application Ser. No. 12/186,016, filed Aug. 5, 2008, which claims the benefit of U.S. Provisional Application No. 60/954,123, filed on Aug. 6, 2007. The disclosures of the above applications are incorporated herein by reference in their entirety.

FIELD

The present disclosure relates to network-based mobility and more particularly to packet data network specific addressing solutions within a framework of network-based mobility.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Referring now to FIG. 1, a functional block diagram of a wireless communications system is presented. A home network 102 receives packets from and sends packets to a distributed communications system 104, such as the Internet. A wireless terminal 106 wirelessly connects to the home network 102. For example only, the wireless terminal 106 may be a mobile phone, and the home network 102 may be the cellular network of a mobile phone operator.

The wireless terminal 106 is configured to work with the home network 102, and may be unable to connect to the networks of other carriers. In various implementations, the wireless terminal 106 may be able to view content from the distributed communications system 104 via the home network 102. The home network 102 may interconnect with the networks of other service providers and/or core networks.

Referring now to FIG. 2, a functional block diagram of a wireless communications system offering mobility is presented. The home network 102 is connected to one or more visited networks 110. For example only, FIG. 2 depicts three visited networks 110-1, 110-2, and 110-3. In various implementations, the visited networks 110 may be the networks of other service providers, including service providers in other countries.

A mobile wireless terminal 120 includes mobility features that allow it to communicate with the visited networks 110. For example, in FIG. 2, the mobile wireless terminal 120 has established a wireless connection to the visited network 110-1. The mobile wireless terminal 120 includes the code and data used to communicate with the home network 102 via the visited network 110-1. In this way, the mobile wireless terminal 120 can interface with the home network 102 even when connected to one of the visited networks 110. Because the mobile wireless terminal 120 itself includes mobility features, the mobile wireless terminal 120 may be described as supporting client mobile internet protocol (CMIP).

For example, mobile internet protocol (IP) for IP version 6 (IPv6) is described in request for comment (RFC) 3775, titled "Mobility Support in IPv6," the disclosure of which is hereby incorporated by reference in its entirety. Mobile IP for IP version 4 (IPv4) is described in RFC 3344, entitled "IP Mobility Support for IPv4," the disclosure of which is hereby incorporated by reference in its entirety.

Referring now to FIG. 3, a functional block diagram depicts a wireless communications system that provides proxy mobility to the wireless terminal 106. A home network 150 communicates with visited networks 160-1, 160-2, and 160-3. The visited networks 160 provide transparent mobility to wireless terminals, such as the wireless terminal 106, which do not include mobility functionality. This may be referred to as proxy mobile IP (PMIP) or network mobile IP. Proxy mobility in IPv6 is described in an Internet Engineering Task Force (IETF) draft titled "Proxy Mobile IPv6" (published Jun. 18, 2007 and available as "draft-ietf-netlmm-proxymip6-01.txt"), the disclosure of which is hereby incorporated by reference in its entirety.

When the wireless terminal 106 attempts to establish a link with the visited network 160-1, the visited network 160-1 determines the network to which the wireless terminal 106 belongs. In this case, the visited network 160-1 determines that the home network 150 is the appropriate network. The visited network 160-1 then forwards packets from the wireless terminal 106 to the home network 150 and passes packets from the home network 150 to the wireless terminal 106. The wireless terminal 106 can therefore be oblivious to the fact that it is connected to the visited network 160-1 instead of to the home network 150.

Referring now to FIG. 4, a functional block diagram and timeline of an implementation of client mobility is presented. The home network 102 includes a home agent (HA) 180. The HA 180 establishes the logical location of the mobile wireless terminal 120. Packets ultimately destined for the mobile wireless terminal 120 are sent to the HA 180, while packets from the mobile wireless terminal 120 will appear to originate from the location of the HA 180.

The mobile wireless terminal 120 may establish a connection to an access router (AR) 182 within the visited network 110-1. In various implementations, additional ARs (not shown) may be present. The AR 182 may communicate with other networks, including the home network 102.

When the mobile wireless terminal 120 connects to the visited network 110-1, the mobile wireless terminal 120 performs authentication and authorization with the AR 182. This may include communicating with an authentication, authorization, and accounting (AAA) server. The AAA server may retrieve information based on an identifier of the mobile wireless terminal 120, such as a network address identifier, that uniquely identifies the mobile wireless terminal 120. The AAA server may indicate to the AR 182 whether the mobile wireless terminal 120 should be allowed access and what services should be provided.

The mobile wireless terminal 120 receives a local address from the AR 182. Using this address, the mobile wireless terminal 120 can communicate with various network elements, including the HA 180. The mobile wireless terminal 120 transmits a binding update message to the HA 180. The HA 180 allocates a global home address HoA to the mobile wireless terminal 120. The HA 180 may create a binding cache entry that records information about the mobile wireless terminal 120, such as the current address of the mobile wireless terminal 120 and the allocated address HoA.

The HA 180 transmits a binding acknowledgement message to the mobile wireless terminal 120. The binding acknowledgement message includes HoA so that the mobile wireless terminal 120 is aware of its global home address. Packets sent from other network devices, such as other wireless terminals, are sent to that home address. The HA 180 receives those packets and forwards them to the mobile wireless terminal 120. Similarly, packets from the mobile wireless terminal 120 are first sent to the HA 180. The HA 180 then forwards the packets with a source address of HoA. To allow for packets to be exchanged between the mobile wireless terminal 120 and the HA 180, a tunnel is established between the mobile wireless terminal 120 and the HA 180.

Referring now to FIG. 5, a functional block diagram and timeline of an implementation of proxy mobility is presented. The wireless terminal 106 may establish a connection to a media access gateway (MAG) 190 in the visited network 160-1. In various implementations, additional MAGs (not shown) may be present in the visited network 160-1. The MAG 190 may communicate with other networks, including the home network 150.

When the wireless terminal 106 connects, the MAG 190 may authenticate the wireless terminal 106 and determine what services the wireless terminal 106 is authorized to access. The wireless terminal 106 then requests an address from the MAG 190. The MAG 190 determines a local mobility anchor (LMA) to which the wireless terminal 106 belongs. For example only, the MAG 190 may consult a home subscriber server (HSS) to determine the appropriate LMA.

The MAG 190 then sends a proxy binding update identifying the wireless terminal 106 to the identified LMA, which in this case is LMA 192, located in the home network 150. The LMA 192 allocates a home address HoA for the wireless terminal 106. The LMA 192 may also create a binding cache entry to record information about the wireless terminal 106. The LMA 192 sends a proxy binding acknowledgement including HoA to the MAG 190.

The MAG 190 and the LMA 192 establish a tunnel for transfer of packets to and from the wireless terminal 106. The MAG 190 then assigns HoA to the wireless terminal 106. When the wireless terminal 106 transmits a packet, the MAG 190 sends that packet through the tunnel to the LMA 192. The LMA 192 then forwards the packet with a source address of HoA. When a packet arrives at the LMA 192 with a destination address of HoA, the LMA 192 sends the packet to the MAG 190 through the tunnel. The MAG 190 then forwards the packets to the wireless terminal 106.

Using this architecture, the wireless terminal 106 can be unaware of the mobility services provided by the MAG 190. As expected, the wireless terminal 106 has been assigned a home address in the home network 150. The wireless terminal 106 therefore does not need to be aware that it is actually connected to the visited network 160-1 instead of to the home network 150.

Referring now to FIGS. 6-8, exemplary message flow diagrams are presented for various methods of obtaining a layer 3 address (e.g. an IP address). In FIG. 6, an example of dynamic host configuration protocol (DHCP) is shown. DHCP may be used to obtain an IPv4 address or an IPv6 address. DHCP for IPv4 is described in RFC 2131, titled "Dynamic Host Configuration Protocol," the disclosure of which is hereby incorporated by reference in its entirety. DHCP for IPv6 is described in RFC 3315, titled "Dynamic Host Configuration Protocol for IPv6 (DHCPv6)," the disclosure of which is hereby incorporated by reference in its entirety.

After a wireless terminal establishes layer 2 connectivity with an access router, the wireless terminal may broadcast a DHCP request. The access router can then provide the wireless terminal with an address via a DHCP reply. In various implementations, a two-stage process may be performed, where two requests and two replies are sent. The initial request may be a discovery message and the initial reply may be an offer message. A subsequent request indicates an acceptance of the offer of the address and a subsequent reply indicates that the access router acknowledges the request. This subsequent reply may provide additional configuration information, such as domain name server (DNS) addresses.

Referring now to FIG. 7, a timeline depicts exemplary stateless IP address autoconfiguration. Stateless autoconfiguration for IPv6 is described in RFC 2462, titled "IPv6 Stateless Autoconfiguration," the disclosure of which is hereby incorporated by reference in its entirety. After the wireless terminal establishes layer 2 connectivity with an access router, the wireless terminal broadcasts a router solicitation message. The access router can then respond with a router advertisement, which includes an address prefix. The prefix may be local to the access router's network or may be globally routable.

The wireless terminal configures a full IPv6 address based on the provided prefix. For example only, a provided prefix may be a 64-bit value, and the wireless terminal creates a 128-bit IPv6 address using the prefix and a 64-bit value based on an interface identifier of the wireless terminal. For example only, the interface identifier may include a media access control (MAC) address.

The wireless terminal may then verify that the created address is unique, at least within the access router's network. The wireless terminal may determine uniqueness by broadcasting a neighbor discovery message that includes the created address. If no neighbors respond, the wireless terminal assumes that no other network node is using the created address. Neighbor discovery is described in RFC 2461, titled "Neighbor Discovery for IP Version 6 (IPv6)," the disclosure of which is hereby incorporated by reference in its entirety.

Referring now to FIG. 8, an exemplary message diagram depicts a scenario where the wireless terminal attempts to use stateless address autoconfiguration but the access router requires the use of DHCP. After layer 2 connectivity is established, the wireless terminal broadcasts a router solicitation message. The access router responds with a router advertisement message indicating that DHCP is required. For example only, this may be indicated by setting an 'M' flag or an 'O' flag in the router advertisement message. In order to obtain a layer 3 address, the wireless terminal responds by broadcasting a DHCP request. The access router can then assign an address to the wireless terminal and provide that address to the wireless terminal in a DHCP reply.

SUMMARY

A wireless terminal comprises a wireless network interface, an address determination module, and an application module. The wireless network interface receives N address assignment messages over a wireless link, where N is an integer greater than zero. The address determination module extracts a plurality of address components from the N address assignment messages and associates the plurality of address components with a plurality of packet data networks. The application module selectively exchanges packets with one of the plurality of packet data networks based on an associated one of the plurality of address components.

In other features, the address determination module determines an address corresponding to the one of the plurality of packet data networks based on the associated one of the plurality of address components. The address is assigned to the wireless network interface. The wireless network interface uses the address as a source address for packets sent to the one of the plurality of packet data networks. The address determination module performs stateless address autoconfiguration to determine the address.

In further features, the plurality of address components each comprise an internet protocol version 6 address prefix. The N address assignment messages each comprise a router advertisement message. The N address assignment messages each comprise a dynamic host configuration protocol (DHCP) reply. The plurality of address components each comprise one of an internet protocol (IP) version 4 address, an IP version 6 (IPv6) address, and an IPv6 address prefix.

In still other features, the N address assignment messages include an identifier for each of the plurality of packet data networks. The address determination module associates the plurality of address components with the plurality of packet data networks based on the identifiers. The address determination module selectively generates an address request message and the wireless network interface transmits the address request message over the wireless link. The address request message includes desired packet data network identifiers. Each of the plurality of packet data networks corresponds to one of the desired packet data network identifiers.

In other features, the application module selects the desired packet data network identifiers. The application module selects the desired packet data network identifiers based on services requested by applications. The application module selects the plurality of packet data networks from a table that maps services to packet data network identifiers. The address request message comprises at least one of a dynamic host configuration protocol (DHCP) request and a router solicitation message.

In further features, a communications system comprises the wireless terminal and a media access gateway that transmits the N address assignment messages to the wireless terminal over the wireless link and that forwards packets from the wireless terminal to the plurality of packet data networks. The media access gateway forwards a first packet from the wireless terminal to the one of the plurality of packet data networks when a source address of the first packet is based on the associated one of the plurality of address components.

A method comprises receiving N address assignment messages over a wireless link, where N is an integer greater than zero; extracting a plurality of address components from the N address assignment messages; associating the plurality of address components with a plurality of packet data networks; and selectively exchanging packets with one of the plurality of packet data networks based on an associated one of the plurality of address components.

In other features, the method further comprises determining an address corresponding to the one of the plurality of packet data networks based on the associated one of the plurality of address components. The method further comprises using the address as a source address for packets sent to the one of the plurality of packet data networks. The method further comprises performing stateless address autoconfiguration to determine the address. The plurality of address components each comprise an internet protocol version 6 address prefix. The N address assignment messages each comprise a router advertisement message.

In further features, the N address assignment messages each comprise a dynamic host configuration protocol (DHCP) reply. The plurality of address components each comprise one of an internet protocol (IP) version 4 address, an IP version 6 (IPv6) address, and an IPv6 address prefix. The N address assignment messages include an identifier for each of the plurality of packet data networks, and further comprises associating the plurality of address components with the plurality of packet data networks based on the identifiers.

In still other features, the method further comprises selectively generating an address request message and transmitting the address request message over the wireless link. The address request message includes desired packet data network identifiers. Each of the plurality of packet data networks corresponds to one of the desired packet data network identifiers. The method further comprises selecting the desired packet data network identifiers. The method further comprises selecting the desired packet data network identifiers based on services requested by applications.

In other features, the method further comprises selecting the plurality of packet data networks from a table that maps services to packet data network identifiers. The address request message comprises at least one of a dynamic host configuration protocol (DHCP) request and a router solicitation message. The method further comprises forwarding a first packet to the one of the plurality of packet data networks when a source address of the first packet is based on the associated one of the plurality of address components.

A wireless terminal comprises wireless network interfacing means for receiving N address assignment messages over a wireless link, where N is an integer greater than zero; address determination means for extracting a plurality of address components from the N address assignment messages and associating the plurality of address components with a plurality of packet data networks; and application means for selectively exchanging packets with one of the plurality of packet data networks based on an associated one of the plurality of address components.

In other features, the address determination means determines an address corresponding to the one of the plurality of packet data networks based on the associated one of the plurality of address components. The address is assigned to the wireless network interfacing means. The wireless network interfacing means uses the address as a source address for packets sent to the one of the plurality of packet data networks. The address determination means performs stateless address autoconfiguration to determine the address.

In further features, the plurality of address components each comprise an internet protocol version 6 address prefix. The N address assignment messages each comprise a router advertisement message. The N address assignment messages each comprise a dynamic host configuration protocol (DHCP) reply. The plurality of address components each comprise one of an internet protocol (IP) version 4 address, an IP version 6 (IPv6) address, and an IPv6 address prefix.

In still other features, the N address assignment messages include an identifier for each of the plurality of packet data networks. The address determination means associates the plurality of address components with the plurality of packet data networks based on the identifiers. The address determination means selectively generates an address request message and the wireless network interfacing means transmits the address request message over the wireless link. The address request message includes desired packet data network identifiers. Each of the plurality of packet data networks corresponds to one of the desired packet data network identifiers.

In other features, the application means selects the desired packet data network identifiers. The application means selects the desired packet data network identifiers based on services requested by applications. The application means selects the plurality of packet data networks from a table that maps services to packet data network identifiers. The address request message comprises at least one of a dynamic host configuration protocol (DHCP) request and a router solicitation message.

In further features, a communications system comprises the wireless terminal and media access gateway means for transmitting the N address assignment messages to the wireless terminal over the wireless link and for forwarding packets from the wireless terminal to the plurality of packet data networks. The media access gateway means forwards a first packet from the wireless terminal to the one of the plurality of packet data networks when a source address of the first packet is based on the associated one of the plurality of address components.

A media access gateway comprises a wireless network interface and an address assignment module. The wireless network interface establishes a wireless link with a wireless terminal. The address assignment module transmits N address assignment messages to the wireless terminal. N is an integer greater than zero. The N address assignment messages include a plurality of address components and associate the plurality of address components with a plurality of packet data networks.

In other features, the address assignment module selectively permits the wireless terminal to perform stateless address autoconfiguration. The N address assignment messages comprise a router advertisement message. The plurality of address components each comprise an internet protocol version 6 address prefix. The N address assignment messages each comprise a dynamic host configuration protocol (DHCP) reply.

In further features, the plurality of address components each comprise one of an internet protocol (IP) version 4 address, an IP version 6 (IPv6) address, and an IPv6 address prefix. The N address assignment messages include a respective identifier for each of the plurality of packet data networks. The N address assignment messages include the address components in an order. The wireless network interface one of transmits a specification of the order to the wireless terminal and receives the specification from the wireless terminal.

In still other features, the media access gateway further comprises a proxy mobility agent (PMA) module that determines the plurality of packet data networks. The PMA module transmits proxy binding updates to a plurality of local mobility agents corresponding to the plurality of packet data networks. The PMA module receives proxy binding acknowledgements from the plurality of local mobility agents. The address assignment module determines the plurality of address components based on address information in the proxy binding acknowledgements. The address assignment module receives an address request message from the wireless terminal. The address request message includes desired packet data network identifiers.

In other features, the PMA module determines the plurality of packet data networks based on the desired packet data network identifiers. The address request message comprises at least one of a dynamic host configuration protocol (DHCP) request and a router solicitation message. The media access gateway further comprises a profile determination module that retrieves a profile corresponding to the wireless terminal. The PMA module determines the plurality of packet data networks based on packet data network identifiers in the profile. The profile determination module retrieves the profile from a home subscriber server.

A method comprises establishing a wireless link with a wireless terminal and transmitting N address assignment messages to the wireless terminal. The N address assignment messages include a plurality of address components and associate the plurality of address components with a plurality of packet data networks, where N is an integer greater than zero.

In other features, the method further comprises selectively permitting the wireless terminal to perform stateless address autoconfiguration. The N address assignment messages comprise a router advertisement message. The plurality of address components each comprise an internet protocol version 6 address prefix. The N address assignment messages each comprise a dynamic host configuration protocol (DHCP) reply.

In further features, the plurality of address components each comprise one of an internet protocol (IP) version 4 address, an IP version 6 (IPv6) address, and an IPv6 address prefix. The N address assignment messages include a respective identifier for each of the plurality of packet data networks. The N address assignment messages include the address components in an order, and further comprises one of transmitting a specification of the order to the wireless terminal and receiving the specification from the wireless terminal.

In still other features, the method further comprises determining the plurality of packet data networks. The method further comprises transmitting proxy binding updates to a plurality of local mobility agents corresponding to the plurality of packet data networks. The method further comprises receiving proxy binding acknowledgements from the plurality of local mobility agents; and determining the plurality of address components based on address information in the proxy binding acknowledgements. The method further comprises receiving an address request message from the wireless terminal. The address request message includes desired packet data network identifiers.

In other features, the method further comprises determining the plurality of packet data networks based on the desired packet data network identifiers. The address request message comprises at least one of a dynamic host configuration protocol (DHCP) request and a router solicitation message. The method further comprises retrieving a profile corresponding to the wireless terminal. The method further comprises determining the plurality of packet data networks based on packet data network identifiers in the profile. The method further comprises retrieving the profile from a home subscriber server.

A media access gateway comprises wireless network interfacing means for establishing a wireless link with a wireless terminal; and address assignment means for transmitting N address assignment messages to the wireless terminal. N is an integer greater than zero. The N address assignment messages include a plurality of address components and associate the plurality of address components with a plurality of packet data networks.

In other features, the address assignment means selectively permits the wireless terminal to perform stateless address autoconfiguration. The N address assignment messages comprise a router advertisement message. The plurality of address components each comprise an internet protocol version 6 address prefix. The N address assignment messages each comprise a dynamic host configuration protocol (DHCP) reply. The plurality of address components each comprise one of an internet protocol (IP) version 4 address, an IP version 6 (IPv6) address, and an IPv6 address prefix.

In further features, the N address assignment messages include a respective identifier for each of the plurality of packet data networks. The N address assignment messages include the address components in an order. The wireless network interfacing means one of transmits a specification of the order to the wireless terminal and receives the specification from the wireless terminal. The media access gateway further comprises proxy mobility agent (PMA) means for determining the plurality of packet data networks. The PMA means transmits proxy binding updates to a plurality of local mobility agents corresponding to the plurality of packet data networks.

In still other features, the PMA means receives proxy binding acknowledgements from the plurality of local mobility agents. The address assignment means determines the plurality of address components based on address information in the proxy binding acknowledgements. The address assignment means receives an address request message from the wireless terminal. The address request message includes desired packet data network identifiers. The PMA means determines the plurality of packet data networks based on the desired packet data network identifiers.

In other features, the address request message comprises at least one of a dynamic host configuration protocol (DHCP) request and a router solicitation message. The media access gateway further comprises profile determination means for retrieving a profile corresponding to the wireless terminal. The PMA means determines the plurality of packet data networks based on packet data network identifiers in the profile. The profile determination means retrieves the profile from a home subscriber server.

A computer program stored on a computer-readable medium for use by a processor comprises receiving N address assignment messages over a wireless link, where N is an integer greater than zero; extracting a plurality of address components from the N address assignment messages; associating the plurality of address components with a plurality of packet data networks; and selectively exchanging packets with one of the plurality of packet data networks based on an associated one of the plurality of address components.

In other features, the computer program further comprises determining an address corresponding to the one of the plurality of packet data networks based on the associated one of the plurality of address components. The computer program further comprises using the address as a source address for packets sent to the one of the plurality of packet data networks. The computer program further comprises performing stateless address autoconfiguration to determine the address. The plurality of address components each comprise an internet protocol version 6 address prefix. The N address assignment messages each comprise a router advertisement message.

In further features, the N address assignment messages each comprise a dynamic host configuration protocol (DHCP) reply. The plurality of address components each comprise one of an internet protocol (IP) version 4 address, an IP version 6 (IPv6) address, and an IPv6 address prefix. The N address assignment messages include an identifier for each of the plurality of packet data networks, and further comprises associating the plurality of address components with the plurality of packet data networks based on the identifiers.

In still other features, the computer program further comprises selectively generating an address request message and transmitting the address request message over the wireless link. The address request message includes desired packet data network identifiers. Each of the plurality of packet data networks corresponds to one of the desired packet data network identifiers. The computer program further comprises selecting the desired packet data network identifiers. The computer program further comprises selecting the desired packet data network identifiers based on services requested by applications.

In other features, the computer program further comprises selecting the plurality of packet data networks from a table that maps services to packet data network identifiers. The address request message comprises at least one of a dynamic host configuration protocol (DHCP) request and a router solicitation message. The computer program further comprises forwarding a first packet to the one of the plurality of packet data networks when a source address of the first packet is based on the associated one of the plurality of address components.

A computer program stored on a computer-readable medium for use by a processor comprises establishing a wireless link with a wireless terminal and transmitting N address assignment messages to the wireless terminal. The N address assignment messages include a plurality of address components and associate the plurality of address components with a plurality of packet data networks, where N is an integer greater than zero.

In other features, the computer program further comprises selectively permitting the wireless terminal to perform stateless address autoconfiguration. The N address assignment messages comprise a router advertisement message. The plurality of address components each comprise an internet protocol version 6 address prefix. The N address assignment messages each comprise a dynamic host configuration protocol (DHCP) reply.

In further features, the plurality of address components each comprise one of an internet protocol (IP) version 4 address, an IP version 6 (IPv6) address, and an IPv6 address prefix. The N address assignment messages include a respective identifier for each of the plurality of packet data networks. The N address assignment messages include the address components in an order, and further comprises one of transmitting a specification of the order to the wireless terminal and receiving the specification from the wireless terminal.

In still other features, the computer program further comprises determining the plurality of packet data networks. The computer program further comprises transmitting proxy binding updates to a plurality of local mobility agents corresponding to the plurality of packet data networks. The computer program further comprises receiving proxy binding acknowledgements from the plurality of local mobility agents; and determining the plurality of address components based on address information in the proxy binding acknowledgements. The computer program further comprises receiving an address request message from the wireless terminal. The address request message includes desired packet data network identifiers.

In other features, the computer program further comprises determining the plurality of packet data networks based on the desired packet data network identifiers. The address request message comprises at least one of a dynamic host configuration protocol (DHCP) request and a router solicitation message. The computer program further comprises retrieving a profile corresponding to the wireless terminal. The computer program further comprises determining the plurality of packet data networks based on packet data network identifiers in the profile. The computer program further comprises retrieving the profile from a home subscriber server.

In still other features, the systems and methods described above are implemented by a computer program executed by one or more processors. The computer program can reside on a computer readable medium such as but not limited to memory, nonvolatile data storage, and/or other suitable tangible storage mediums.

Further areas of applicability of the present disclosure will become apparent from the detailed description, the claims and the drawings. It should be understood that the detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
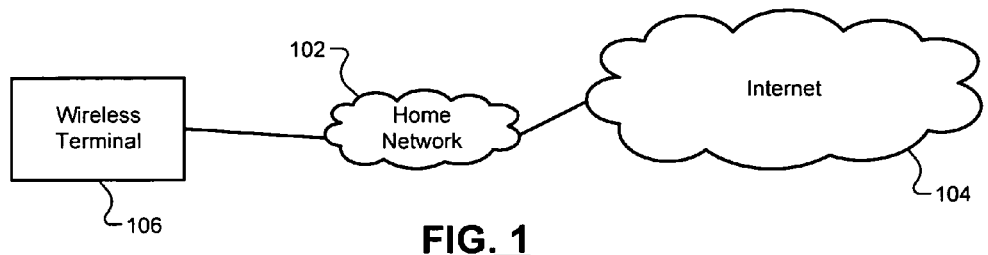
FIG. 1 is a functional block diagram of a wireless communications system according to the prior art.
Figure 2:
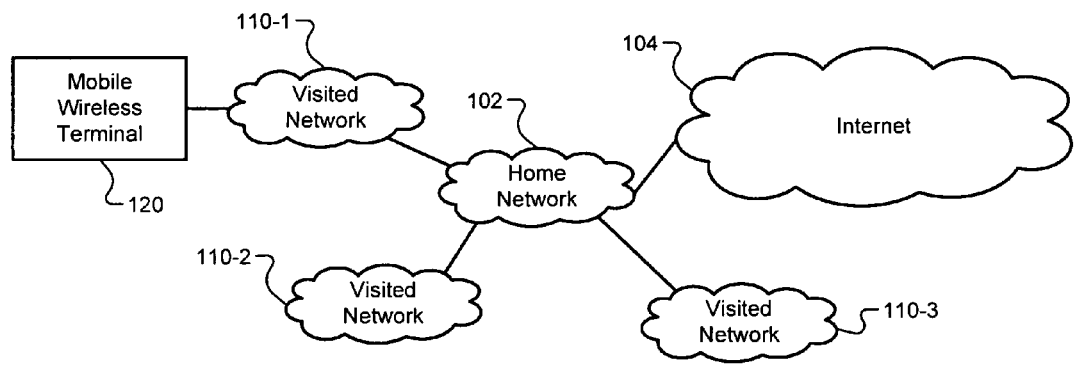
FIG. 2 is a functional block diagram of a wireless communications system offering mobility according to the prior art.
Figure 3:
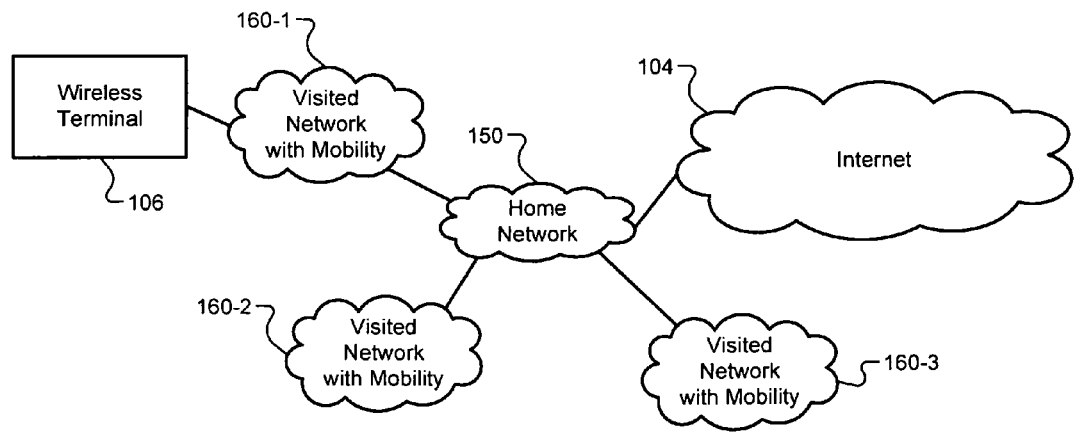
FIG. 3 is a functional block diagram of a wireless communications system according to the prior art that provides proxy mobility to a wireless terminal.
Figure 4:
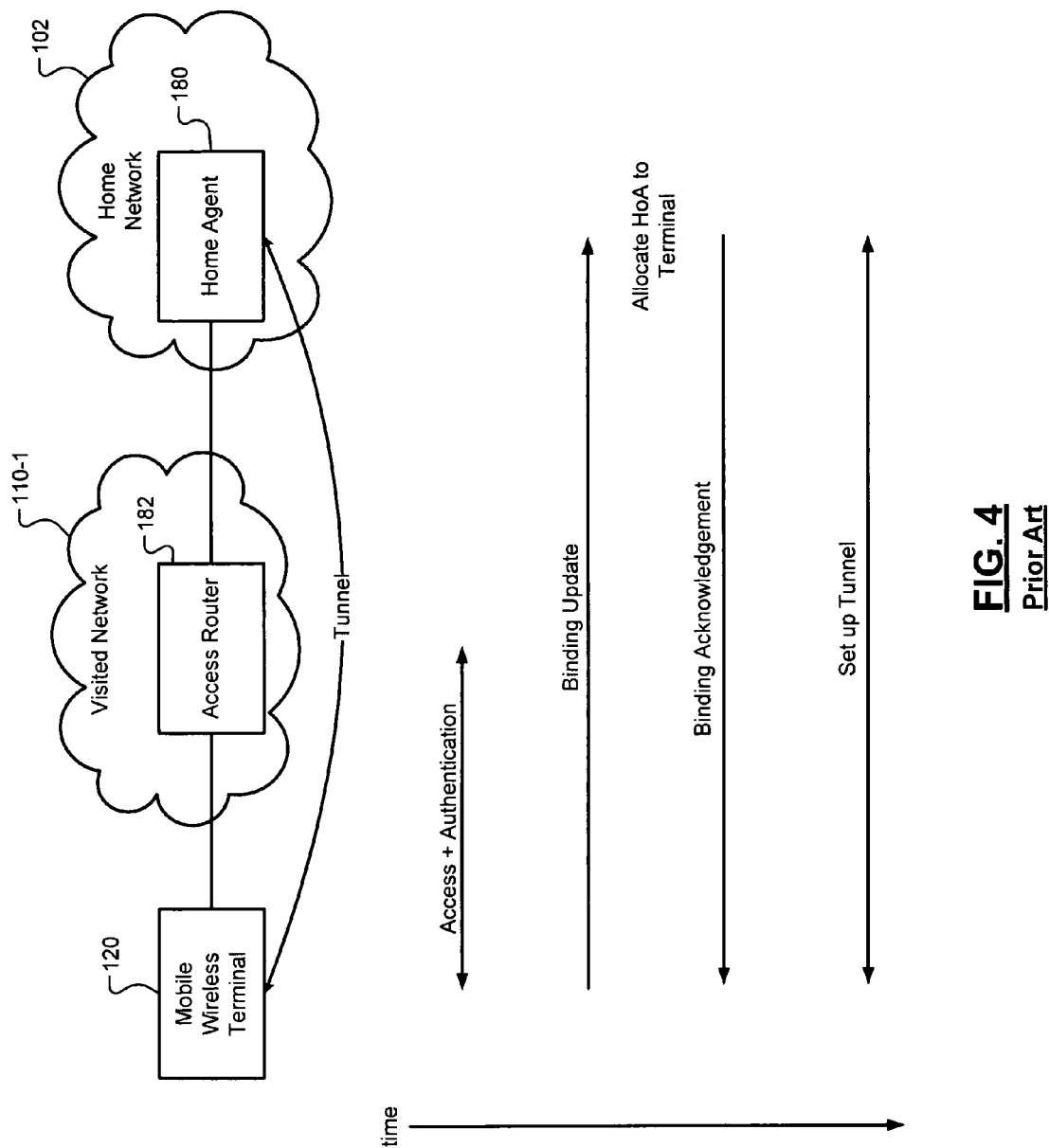
FIG. 4 is a functional block diagram and timeline of an implementation of client mobility according to the prior art.
Figure 5:
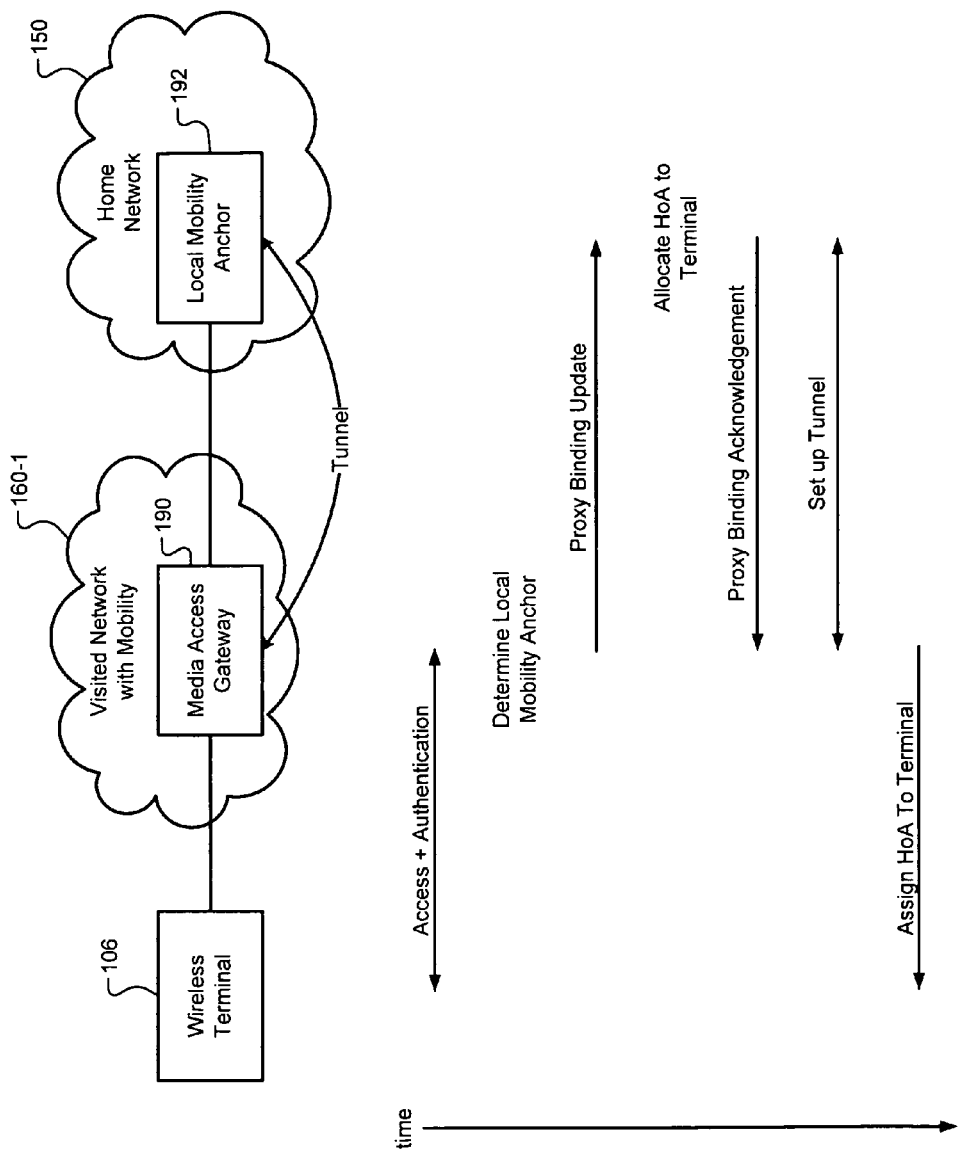
FIG. 5 is a functional block diagram and timeline of an implementation of proxy mobility according to the prior art.
Figure 6:
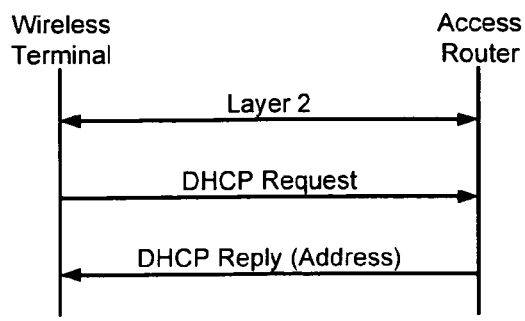
FIGS. 6-8 depict exemplary message flow diagrams for various methods of obtaining a layer 3 address according to the prior art.
Figure 7:
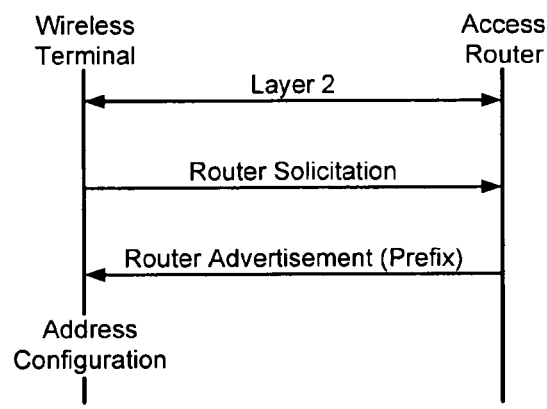
Figure 8:
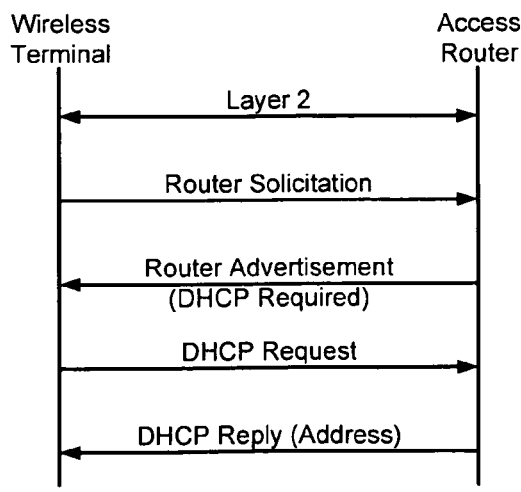

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A wireless terminal roaming in a visited network connects through a home agent (HA) or a local mobility anchor (LMA) to a packet data network (PDN). There may be scenarios where the wireless terminal desires to connect to multiple packet data networks. For example only, one packet data network may be used to provide a service such as push email, while another PDN is used to provide another service such as voice over Internet protocol (VoIP) telephony.

Figure 9:
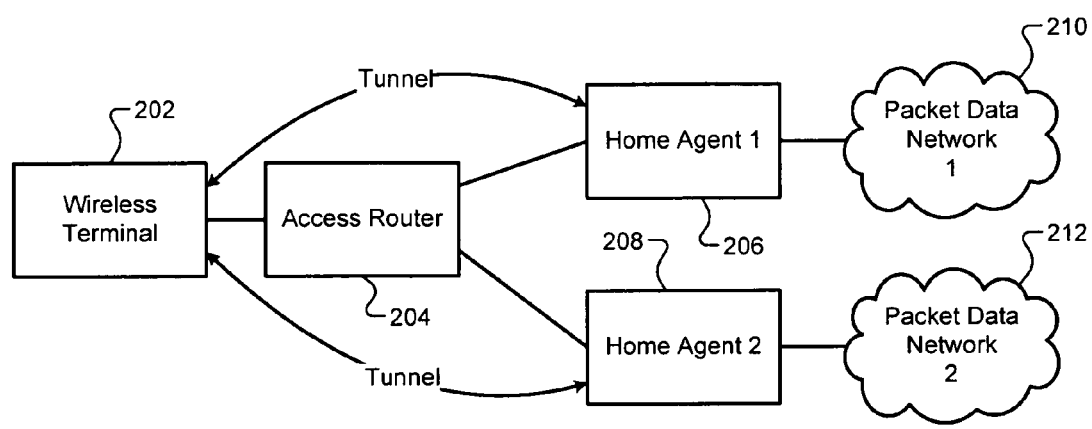
FIG. 9 is a functional block diagram of a wireless terminal using client mobile IP to connect to two home agents according to the principles of the present disclosure.

In brief, FIG. 9 depicts a wireless terminal using client mobile IP to connect to two different HAs. Each HA is associated with a separate PDN. Because the wireless terminal itself establishes tunnels to each of the HAs, the wireless terminal can route traffic to the appropriate HA based on the PDN associated with that HA. For example only, push email may be performed via the first HA while VoIP telephony may be performed via the second HA.

Figures 10, 11:
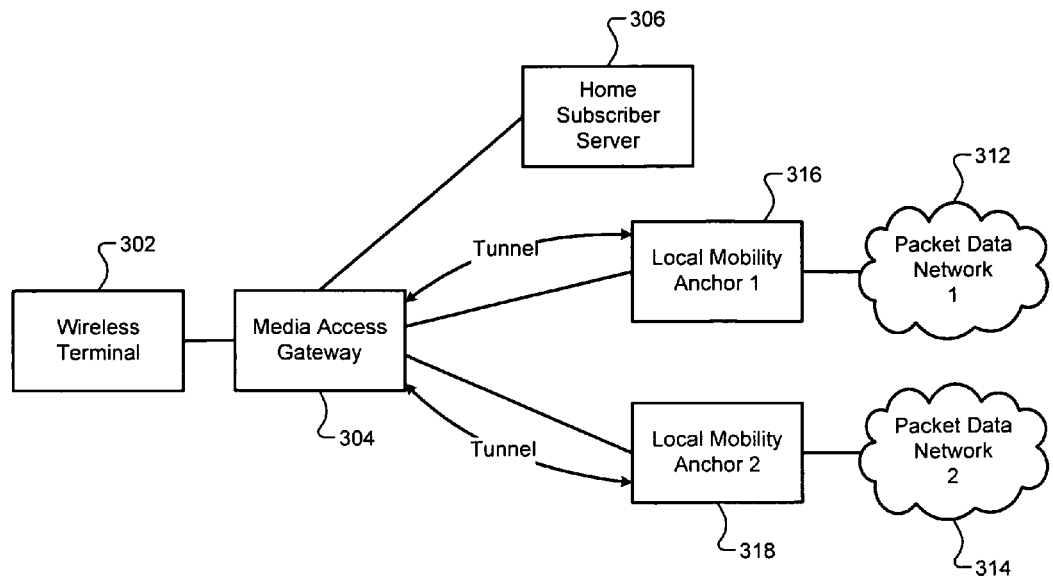
FIG. 10 is a functional block diagram of a wireless terminal using proxy mobile IP to connect to two home agents according to the principles of the present disclosure.
FIG. 11 is an exemplary table that stores access point name (APN) information for various wireless terminals according to the principles of the present disclosure.

However, when using proxy mobility, as shown in FIG. 10, the media access gateway (MAG) establishes connections with the LMAs, instead of the wireless terminal communicating directly with the LMAs. The wireless terminal may receive an address corresponding to each of the LMAs. However, there is no established mechanism for informing the wireless terminal how to differentiate between these addresses. The wireless terminal does not therefore know which address will access the first PDN and which address will access the second PDN.

According to the present disclosure, information identifying each address is provided to the wireless terminal. For example, each PDN may be labeled with an access point name (APN). The MAG signals to the wireless terminal that a first address corresponds to a PDN labeled with a first APN. The wireless terminal therefore knows to use the first address to access services provided by the first PDN.

When the wireless terminal is associated with a second PDN, a second address is provided along with an indication of the APN for the second PDN. The wireless terminal therefore knows that this second address corresponds to the second PDN. The wireless terminal may be preconfigured with various APNs of PDNs that provide various services. Alternatively, a server, such as a home subscriber server, may provide APN information for the wireless terminal. FIG. 11 shows an exemplary table that stores APN information for various wireless terminals.

Referring back to FIG. 9, a functional block diagram of client-based mobile IP for accessing two packet data networks (PDNs) via one access router (AR) is presented. A wireless terminal 202 connects to an access router (AR) 204. The AR 204 provides the wireless terminal 202 with a care-of address (CoA). Using CoA, the wireless terminal 202 can communicate with a first home agent (HA) 206 and a second HA 208.

The wireless terminal 202 may be preprogrammed with the addresses of the first and second HAs 206 and 208. Alternatively, the identities of the first and second HAs 206 and 208 may be determined from a profile for the wireless terminal 202. This profile may be stored remotely, such as in a home subscriber server (HSS). The wireless terminal 202 may communicate with the first HA 206 in order to use services offered by the first packet data network (PDN) 210. The wireless terminal 202 may communicate with the second HA 208 in order to use services provided by a second PDN 212.

The wireless terminal 202 may retrieve, from storage local to the wireless terminal 202 or from remote storage, the address of an HA that will allow access to a PDN that provides a desired service. For example, if the first PDN 210 provides text messaging functionality, the wireless terminal 202 may retrieve the address of the first HA 206 when the wireless terminal 202 desires to perform text messaging.

The wireless terminal 202 creates a tunnel to the first HA 206. The wireless terminal 202 sends packets for the first PDN 210 through the tunnel to the first HA 206. Packets destined for the wireless terminal 202 from the first PDN 210 are sent to the wireless terminal 202 through the tunnel by the first HA 206. Similarly, the wireless terminal 202 creates a tunnel with the second HA 208 for exchanging packets with the second PDN 212.

Referring now to FIG. 10, a functional block diagram of proxy mobility being used to access multiple PDNs is presented. A wireless terminal 302 connects to a media access gateway (MAG) 304. The wireless terminal 302 establishes layer 2 connectivity with the MAG 304 and then requests a layer 3 address.

The MAG 304 may access a profile associated with the wireless terminal 302. The profile may be stored in a home subscriber server (HSS) 306. An example of a partial profile entry for the HSS 306 is shown in FIG. 11. The profile may specify to which PDNs the wireless terminal 302 should be connected. The wireless terminal 302 may also provide information regarding with which PDNs the wireless terminal 302 desires to connect.

In various implementations, each PDN may be identified by an access point name (APN). The APN may be a logical name that resolves to a numeric or other identifier of a PDN. If the wireless terminal 302 does not provide an indication of the desired APNs, the MAG 304 may initiate connections with default APNs specified by the profile. Various ones of the APNs listed in the profile may be designated as default APNs. Alternatively, all APNs in the profile may be considered default APNs.

When the wireless terminal 302 provides a set of APNs to which it desires to connect, this set of APNs may be modified by the MAG 304. For example, local policies of the MAG and/or roaming agreements between the MAG and a home network of the wireless terminal 302 may restrict which APNs are available. In addition, the APNs specified by the wireless terminal 302 may be restricted to those listed in the profile of the wireless terminal 302. In other words, the wireless terminal 302 may be constrained to specify only APNs that are listed in the profile of the wireless terminal 302.

The MAG 304 then begins to establish connections corresponding to each of the selected APNs. The profile may specify LMA addresses corresponding to each APN. Alternatively, the MAG 304 may resolve APNs into LMA addresses using a lookup table or a query, such as a domain name system (DNS) query. For example only, FIG. 10 depicts a scenario where the wireless terminal 302 will communicate with first and second PDNs 312 and 314, which are identified by $APN_1$ and $APN_2$, respectively.

$APN_1$ and $APN_2$ may be associated with addresses $LMA_1$ and $LMA_2$, respectively, for first and second LMAs 316 and 318. The MAG 304 provides home address information corresponding to the first LMA 316 to the wireless terminal 302. The address information may be a full address and/or may be an address prefix from which the wireless terminal 302 can generate a full address. The MAG 304 indicates to the wireless terminal 302 the APN with which that address is associated. When the wireless terminal 302 sends packets using that address, the MAG 304 will tunnel the packets to the first LMA 316 for forwarding to the first PDN 312. This address will also be the destination address for packets sent from the first PDN 312 to the wireless terminal 302.

As described in more detail below, the MAG 304 may transmit address information and identification of the associated APNs to the wireless terminal 302 using existing protocols. For example only, address and APN information may be transmitted to the wireless terminal 302 in extensions of dynamic host configuration protocol (DHCP) reply messages and/or router advertisement messages. The wireless terminal 302 may transmit lists of desired APNs to the MAG 304 using DHCP request messages and/or router solicitation messages.

As described in more detail below, the address information provided to the wireless terminal 302 may be obtained from the profile and/or may be received from the first LMA 316. In various implementations, the MAG 304 may initially provide address information stored in the profile. Once the MAG 304 receives address information from the first LMA 316, the MAG 304 may also provide this address information to the wireless terminal 302. If the address information received from the first LMA 316 is the same as the address information already sent, the second address transmission may be omitted.

The MAG 304 creates a tunnel to the first LMA 316 for exchanging packets between the wireless terminal 302 and the first PDN 312. Similarly, the MAG 304 establishes a tunnel to the second LMA 318 for exchanging packets between the wireless terminal 302 and the second PDN 314.

Referring now to FIG. 11, a partial profile in a profile database is displayed. In various implementations, this profile database may be stored in a home subscriber server. A first column includes an identifier of the mobile node, also known as a wireless terminal. The first profile may correspond to a wireless terminal uniquely identified by terminal_ID. For purposes of illustration only, a portion of a single profile is shown, although multiple profiles may be present, as indicated by an ellipsis. The first profile includes multiple APNs, and each of the APNs denotes a PDN to which the wireless terminal can connect. Each APN may be associated with an LMA address. In addition, home address information may be stored. For example only, home address prefixes are shown in FIG. 11.

A first prefix may correspond to the address $LMA_1$, while a second prefix may correspond to the address $LMA_2$. If the prefix is not stored in the profile, the MAG queries the appropriate LMA to determine the prefix. For example only, prefixes may be stored in the profile if the LMA has previously serviced the wireless terminal. Specifically, a prefix may be available if a wireless terminal is handing off from one MAG to another while using the same LMA. Even if the prefix is available in the profile, the MAG may verify with the corresponding LMA to see if the prefix is still valid. For purposes of illustration only, the profile shown in FIG. 11 lists two APNs, while an ellipsis indicates that others may be present.

Figure 12A:
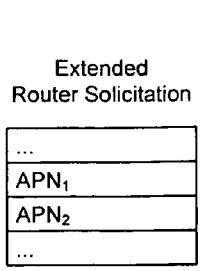
FIGS. 12A-12B depict exemplary data structures used for transmitting APN information during stateless address autoconfiguration according to the principles of the present disclosure.
Figure 12B:
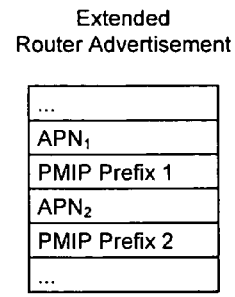

Referring now to FIGS. 12A-12B, exemplary data structures for transmitting APN information in a router solicitation message and a router advertisement message, respectively, are shown. In FIG. 12A, an extended router solicitation message is shown. The router solicitation message, which may be used as part of stateless address autoconfiguration, can be extended to include a list of APNs.

A wireless terminal can then transmit a list of desired APNs in the extended router solicitation message. A MAG that is capable of interpreting the extended router solicitation message may retrieve this list of APNs. Less capable MAGs may ignore the extended information in the extended router solicitation message. The MAG may modify the list of APNs and begin establishing tunnels with LMAs associated with those APNs. APN information may be included in a previously-defined or new field of a previously-defined or new option of a router solicitation message.

FIG. 12B depicts a router advertising message that is extended to signal APN information associated with address information. APN information may be included in a previously-defined or new field of a previously-defined or new option of a router advertisement message. For example only, a list is shown with alternating APN values and associated PMIP address prefixes. In this list, an address prefix corresponds to the preceding APN. A MAG can transmit home address prefixes for each LMA to the wireless terminal using such an extended router advertising message.

Various other mechanisms for signaling APN information to the wireless terminal can be used. For example only, the order of APNs sent in an extended router solicitation message, such as that shown in FIG. 12A, may be recorded by the MAG. The MAG may then provide prefixes corresponding to the APNs in a router advertisement message in the same order. The wireless terminal therefore knows which prefix applies to which APN based on the order of the received prefixes. For requested APNs for which the MAG cannot or will not provide a prefix, the place of the prefix may be held by a known value, such as 0.

Figure 13A:
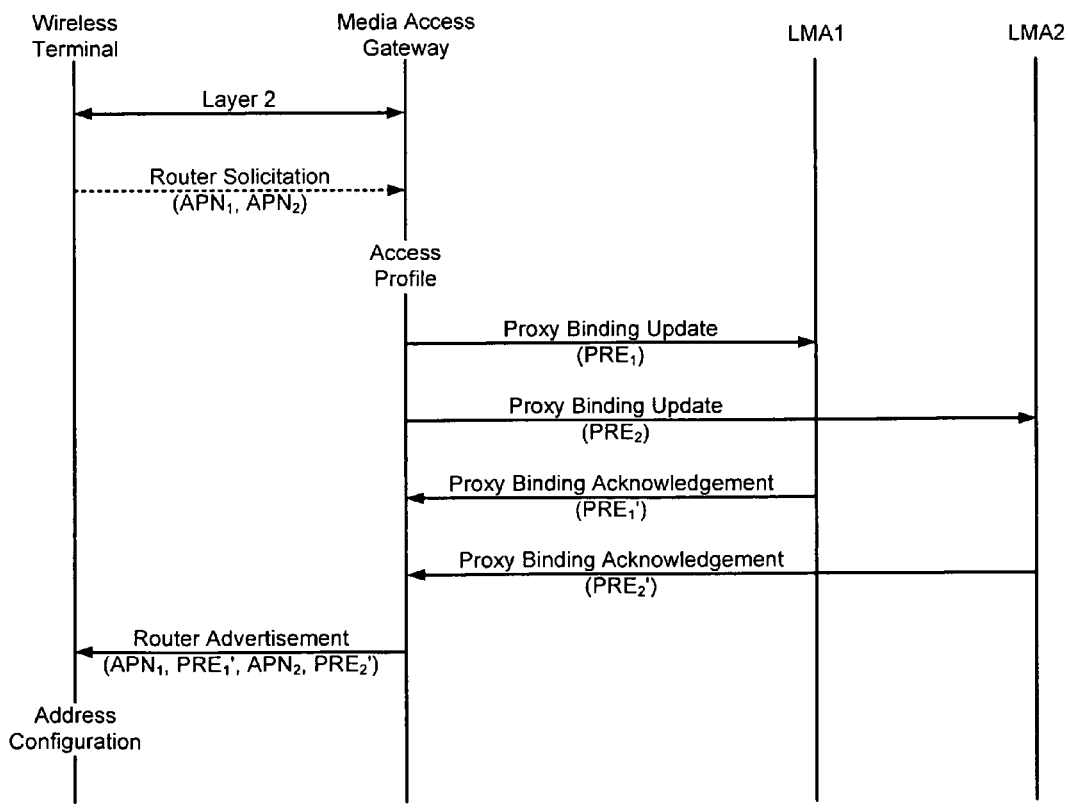
FIGS. 13A-13B are message flow diagrams depicting exemplary methods of transmitting APN information via stateless address autoconfiguration according to the principles of the present disclosure.

Referring now to FIG. 13A, an exemplary message flow diagram is presented. The Y-axis represents time, with time increasing in the downward direction. The wireless terminal establishes layer 2 connectivity with the MAG. The wireless terminal may then broadcast a router solicitation message specifying the APNs to which it is interested in connecting. For example only, the wireless terminal may indicate that it is interested in connecting to the PDNs specified by $APN_1$ and $APN_2$. For purposes of illustration only, FIGS. 13A-13B and 15A-15B assume that the wireless terminal will be associated with the first and second LMAs, which interface with first and second PDNs, respectively. The first and second PDNs have APNs $APN_1$ and $APN_2$, respectively.

The MAG accesses the profile of the wireless terminal. The profile may include APN information and corresponding LMA addresses. Based on the profile and/or the router solicitation message, a group of PDNs is selected. The MAG initiates communication with LMAs associated with the selected group of PDNs. In this example, the MAG sends proxy binding updates to the first and second LMAs.

The proxy binding updates include the identity of the wireless terminal. For example, an identification code of the wireless terminal may be included. Alternatively, address information from the profile of the wireless terminal may be provided. For example, a prefix stored for the wireless terminal may be included. Prefixes may be uniquely assigned to the wireless terminal and therefore provide a unique identification of the wireless terminal.

The proxy binding update sent to the first LMA may include a first prefix $PRE_1$, which the wireless terminal's profile indicates corresponds to the first LMA. This first prefix may originally have been assigned to the wireless terminal by the first LMA. The proxy binding update sent to the second LMA may include a second prefix $PRE_2$ for the wireless terminal corresponding to the second LMA.

The first and second LMAs may create binding cache entries to track the current location and status of the wireless terminal. The first and second LMAs then send proxy binding acknowledgements to the MAG. Each proxy binding acknowledgement may include address information that is the same as or different than that sent in the proxy binding update. For example, the address prefix retrieved from the profile may be outdated. In addition, the LMAs may desire to provide different prefixes than were previously stored in the profile. The proxy binding acknowledgements may therefore include, for example only, new prefixes $PRE_1'$ and $PRE_2'$.

Once the MAG receives the proxy binding acknowledgements, the MAG provides the received prefixes $PRE_1'$ and $PRE_2'$ to the wireless terminal in a router advertisement message. The MAG also signals which prefix corresponds to which APN. The wireless terminal then configures IP addresses corresponding to each of the received prefixes. For example only, this address configuration may be performed according to stateless IP address autoconfiguration.

In various implementations, the MAG may provide a router advertisement message to the wireless terminal as soon as the first proxy binding acknowledgement is received. Address information from later proxy binding acknowledgements can be sent in additional router advertisement messages. For purposes of illustration only, the proxy binding acknowledgement from the first LMA is shown being received first, although the proxy binding acknowledgements may arrive in any order.

Figure 13B:
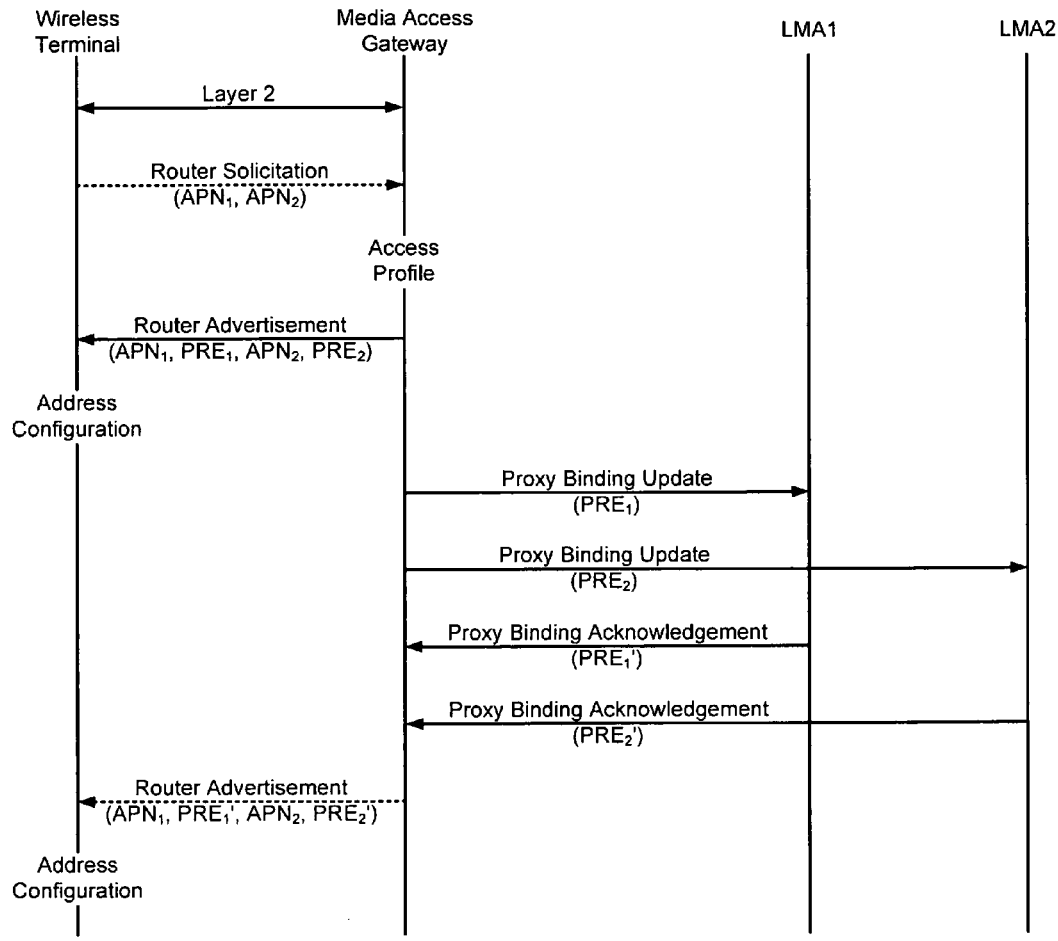

Referring now to FIG. 13B, a router advertisement may be sent to the wireless terminal before any proxy binding acknowledgements are received. In this case, the router advertisement message will include prefixes that are determined from the profile. This initial router advertisement may be sent only if one or more prefixes are available from the profile.

If prefixes received from the LMAs in the proxy binding acknowledgements are different from those provided by the profile, the MAG provides the received address information to the wireless terminal. The information from the proxy binding acknowledgements can be sent in one or more additional router advertisements.

The wireless terminal may have to re-configure any interface that receives a new address prefix in these additional router advertisements. This may break session continuity for services using that interface. However, latency has been reduced by providing address information at the earliest opportunity. If the prefixes do not need to be updated, the additional router advertisements are unnecessary and the wireless terminal can continue using the IP addresses established earlier.

Figure 14A:
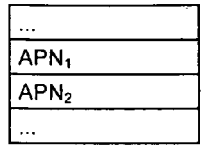
FIGS. 14A-14B depict exemplary data structures used for transmitting APN information via stateful address configuration protocols according to the principles of the present disclosure.
Figure 14B:
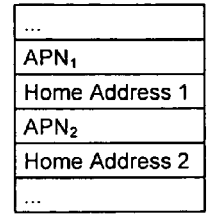

Referring now to FIGS. 14A and 14B, exemplary data structures for transmitting APN information in a DHCP request and a DHCP reply, respectively, are presented. In FIG. 14A, a DHCP request is shown as extended to allow for a wireless terminal to indicate desired PDN information. The wireless terminal can generate the extended DHCP request with a list of APNs corresponding to the desired PDNs.

A MAG that is capable of processing the extended DHCP request can provide connectivity to the wireless terminal for each of the LMAs corresponding to the supplied APNs. For example only, the set of APNs provided by the wireless terminal is shown in FIG. 14A as a list. In various implementations, the wireless terminal may transmit a DHCP request for each desired APN. APN information may be included in a previously-defined or new field of a previously-defined or new option of a DHCP request.

FIG. 14B shows a DHCP reply that has been extended to allow APN information to be supplied from the MAG to the wireless terminal. The extended DHCP reply includes address information along with information specifying with which APN the address information is associated. For example only, APNs and addresses may alternate in the extended DHCP reply, where each home address corresponds to the preceding APN. In various implementations, the extended DHCP reply may include full home addresses for the wireless terminal. Alternatively, the extended DHCP reply may include address prefixes or other information. APN information may be included in a previously-defined or new field of a previously-defined or new option of a DHCP reply.

Figure 15A:
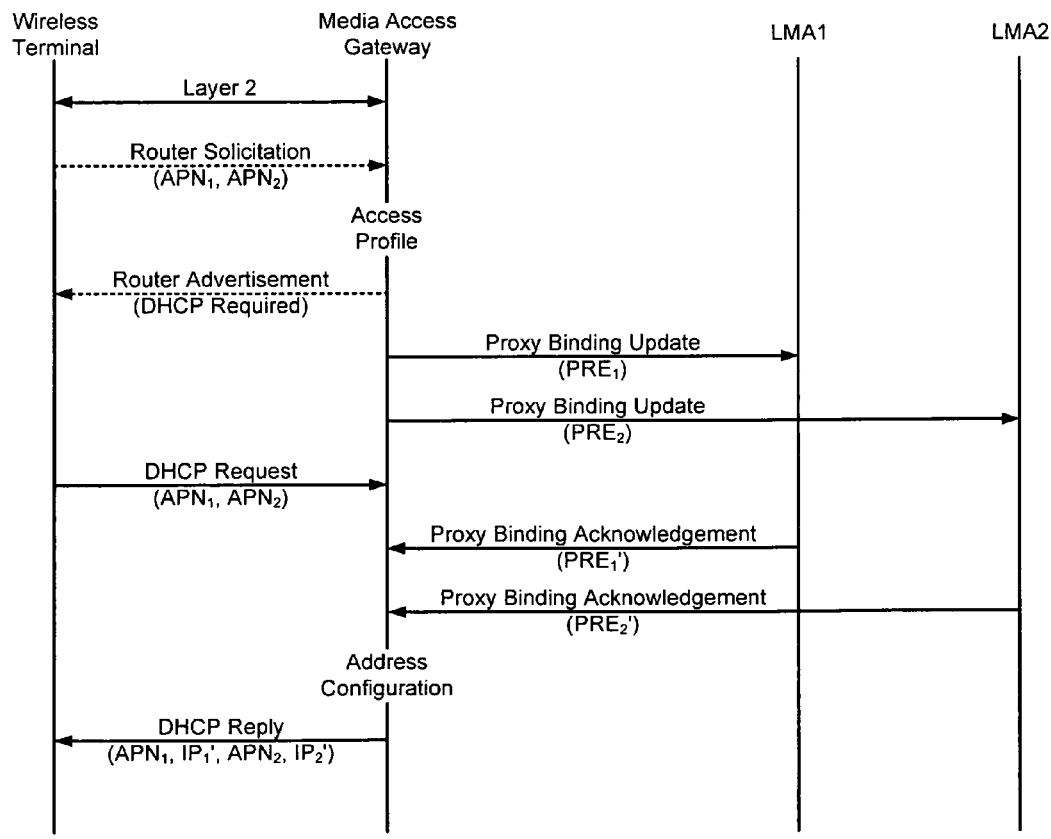
FIGS. 15A-15B are message flow diagrams depicting exemplary methods of transmitting APN information via stateful address configuration according to the principles of the present disclosure.
Figure 15B:
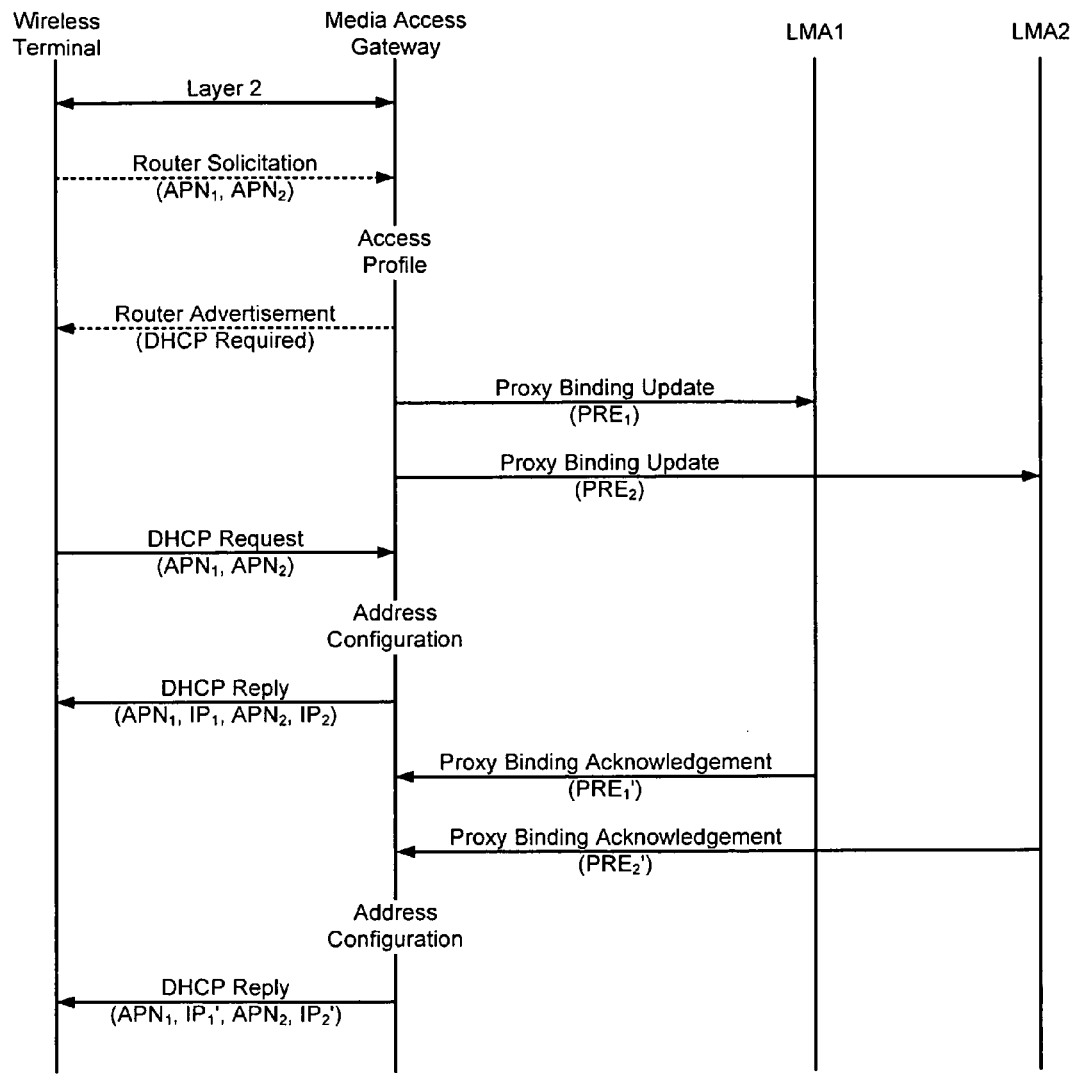

Referring now to FIG. 15A, an exemplary message flow diagram is presented. After establishing layer 2 connectivity with the media access gateway, the wireless terminal may broadcast a router solicitation message including desired APN information. The MAG accesses the profile corresponding to the wireless terminal.

If the MAG decides not to allow stateless address autoconfiguration for the wireless terminal, or stateless address autoconfiguration is not available, the MAG may respond that DHCP is required. For example, the MAG may transmit a router advertisement message to the wireless terminal indicating that DHCP is required. The wireless terminal will then broadcast a DHCP request in order to obtain address information.

The DHCP request may also include desired APN information. Before or after receiving the DHCP request, the MAG may transmit proxy binding updates to LMAs. The LMAs are chosen based on APN information in the router solicitation message, the DHCP request, and/or the profile of the wireless terminal. The proxy binding updates may be sent as soon as the profile is accessed to receive proxy binding acknowledgements as soon as possible. The proxy binding acknowledgements may even be received prior to the DHCP request being received.

The MAG may perform address configuration to determine IP addresses based on the prefixes provided in the proxy binding acknowledgement. The determined IP addresses are provided to the wireless terminal in a DHCP reply. The DHCP reply is extended to indicate the APNs to which each of the determined IP addresses corresponds In FIG. 15B, a DHCP reply is sent to the wireless terminal once the DHCP request has been received. An initial DHCP reply may be sent before the proxy binding acknowledgements are received by the MAG. The initial DHCP reply therefore includes addresses based on address information from the profile of the wireless terminal. After receiving address information from the LMAs, which may differ from what is stored in the profile, the MAG transmits additional DHCP replies to the wireless terminal. These replies include addresses determined from the updated address information received from the LMAs.

Figures 16, 17:
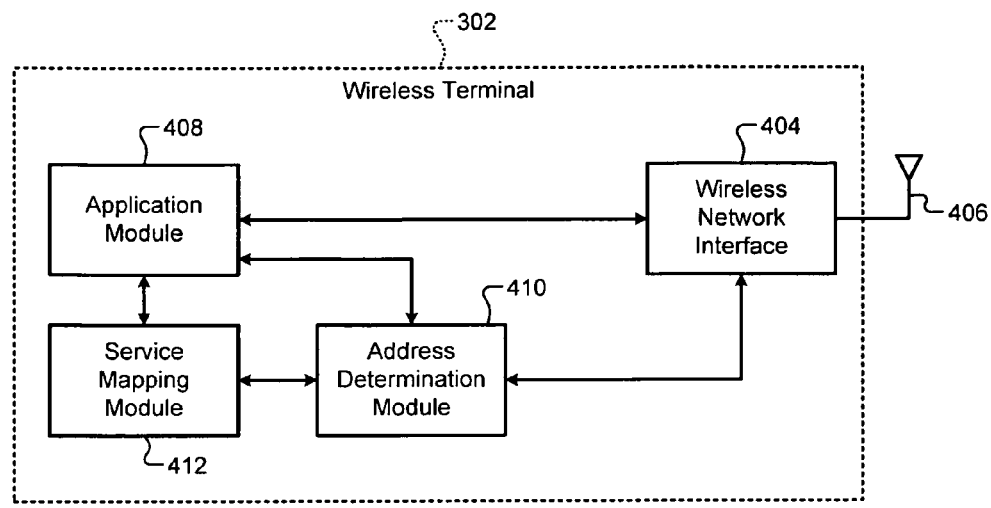
FIG. 16 is a functional block diagram of an exemplary implementation of a wireless terminal that can interface with multiple packet data networks (PDNs) according to the principles of the present disclosure.
FIG. 17 is an exemplary table stored by the wireless terminal mapping services to APNs according to the principles of the present disclosure.

Referring now to FIG. 16, a functional block diagram of an exemplary implementation of the wireless terminal 302 is presented. The wireless terminal 302 includes a wireless network interface 404 that transmits and receives wireless signals using an antenna 406. An application module 408 sends and receives data using the wireless network interface 404. The application module 408 may transmit and receive voice over IP (VoIP) data, text messaging data, push e-mail data, World Wide Web data such as hypertext markup language (HTML) data, etc.

The wireless network interface 404 may maintain multiple IP addresses, one IP address for each PDN with which the wireless terminal 302 is associated. Each PDN may provide one or more of the services used by the application module 408. The application module 408 may specify to the wireless network interface 404 which service to use for any given data. The wireless network interface 404 can then use the appropriate IP address for that data.

An address determination module 410 configures an address for each PDN with which the wireless network interface 404 communicates. The desired PDNs may be determined based upon the services desired by the application module 408. The application module 408 may consult a service mapping module 412 to determine which PDNs can be used to access the desired services.

FIG. 17 depicts an exemplary table stored in the service mapping module 412. Each service that the application module 408 requests may be identified by a service identifier. The table may include mappings of service identifiers to PDN, where the PDN is identified by its APN. In various implementations, a single PDN may provide more than one service.

For purposes of illustration only, when the application module 408 requests service 7 (web browsing), the table in the service mapping module 412 may indicate that the PDN identified by $APN_3$ should be used. The application module 408 and/or the service mapping module 412 may then signal to the address determination module 410 that $APN_3$ is desired.

The address determination module 410 establishes connectivity with the desired APNs. In various implementations, the address determination module 410 may establish connectivity with a set of default APNs. The address determination module 410 may instruct the wireless network interface 404 to transmit router solicitation messages and/or DHCP requests including desired APN information.

When router advertisements and/or DHCP replies are received, the address determination module 410 parses these messages to extract IP address information. The address determination module 410 may form full IP addresses based on prefixes. The address determination module 410 may then indicate to the application module 408 which IP address corresponds to which APN. The application module 408 can then instruct the wireless network interface 404 to use the IP address corresponding to a certain APN for data related to the services provided by that APN.

Figure 18:
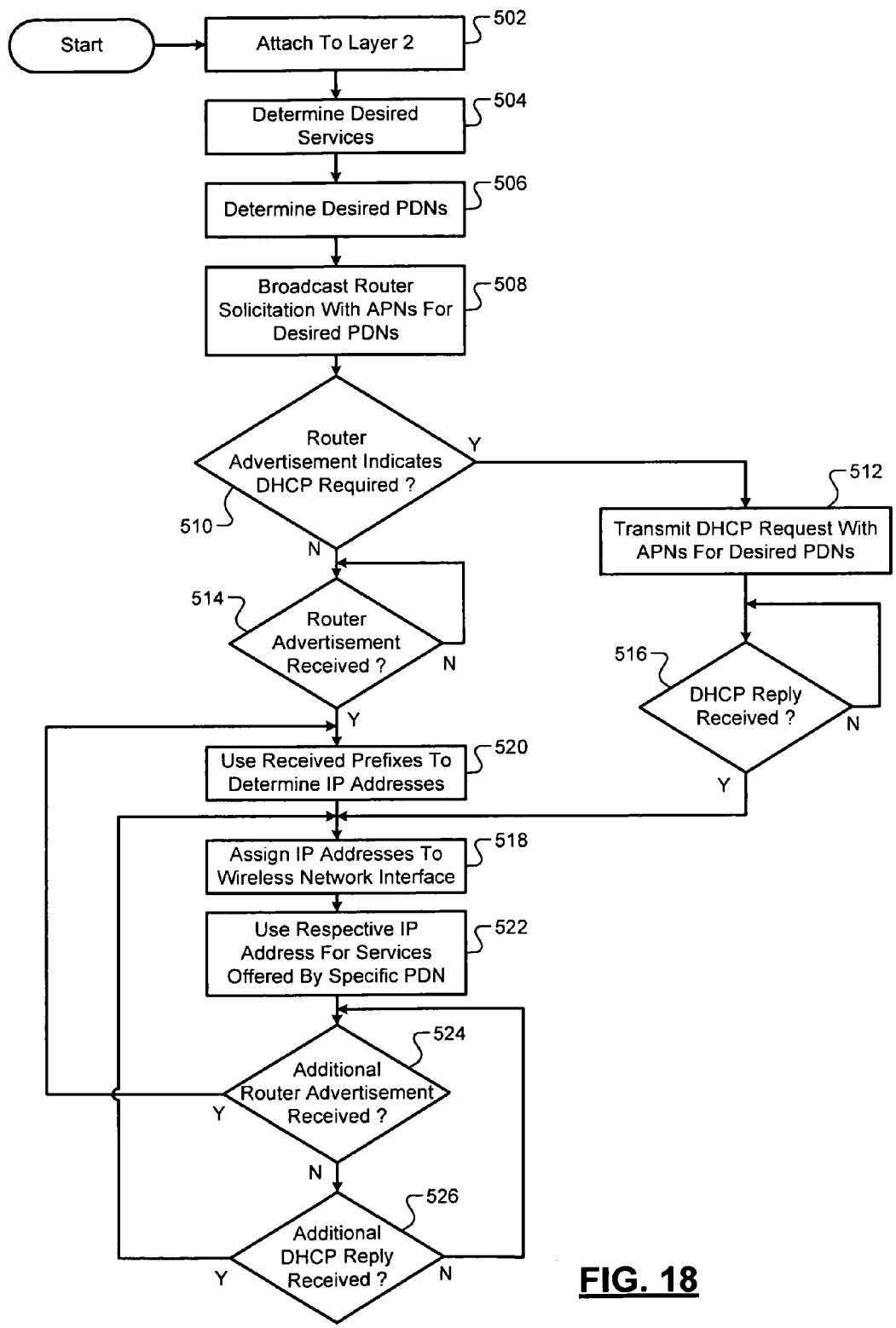
FIG. 18 depicts exemplary steps performed by the wireless terminal according to the principles of the present disclosure.

Referring now to FIG. 18, a flowchart depicts exemplary steps performed by the wireless terminal 302 of FIG. 16. Control begins in step 502, where the wireless terminal establishes layer 2 connectivity. Control continues in step 504, where the wireless terminal determines the desired services. Control continues in step 506, where PDNs that can provide the desired services are identified.

Control continues in step 508, where a router solicitation message is broadcast. The router solicitation message is extended to allow APN information to be included. The router solicitation may therefore includes APNs corresponding to the desired PDNs determined from step 506. Control continues in step 510, where control determines whether a router advertisement message has indicated that DHCP is required. If so, control transfers to step 512; otherwise, control transfers to step 514.

In step 512, a DHCP request is transmitted that includes APNs corresponding to the desired PDNs. Control continues in step 516, where control remains until a DHCP reply has been received. Once the DHCP reply has been received, control transfers to step 518. In step 514, control waits for a router advertisement message to be received. Once the router advertisement message has been received, control transfers to step 520. In step 520, control uses the prefixes received in the router advertisement message to determine IP addresses. Control continues in step 518.

In step 518, control assigns IP addresses to the wireless network interface. These IP addresses were determined in step 520 or received in a DHCP reply in step 516. Control continues in step 522, where control uses the respective IP address for services offered by a specific PDN. Control continues in step 524, where control determines whether an additional router advertisement message has been received. If so, control returns to step 520; otherwise, control continues in step 526. The additional router advertisement may include updated prefixes received from the LMAs. Control therefore determines new addresses in step 520.

In step 526, control determines whether an additional DHCP reply has been received. If so, control returns to step 518 to assign these new IP addresses to the wireless network interface. Otherwise, control returns to step 524. In various implementations, additional control steps may be included to accommodate the transmission of additional requests for additional PDN connectivity beyond that indicated in steps 508 or 512.

Figure 19:
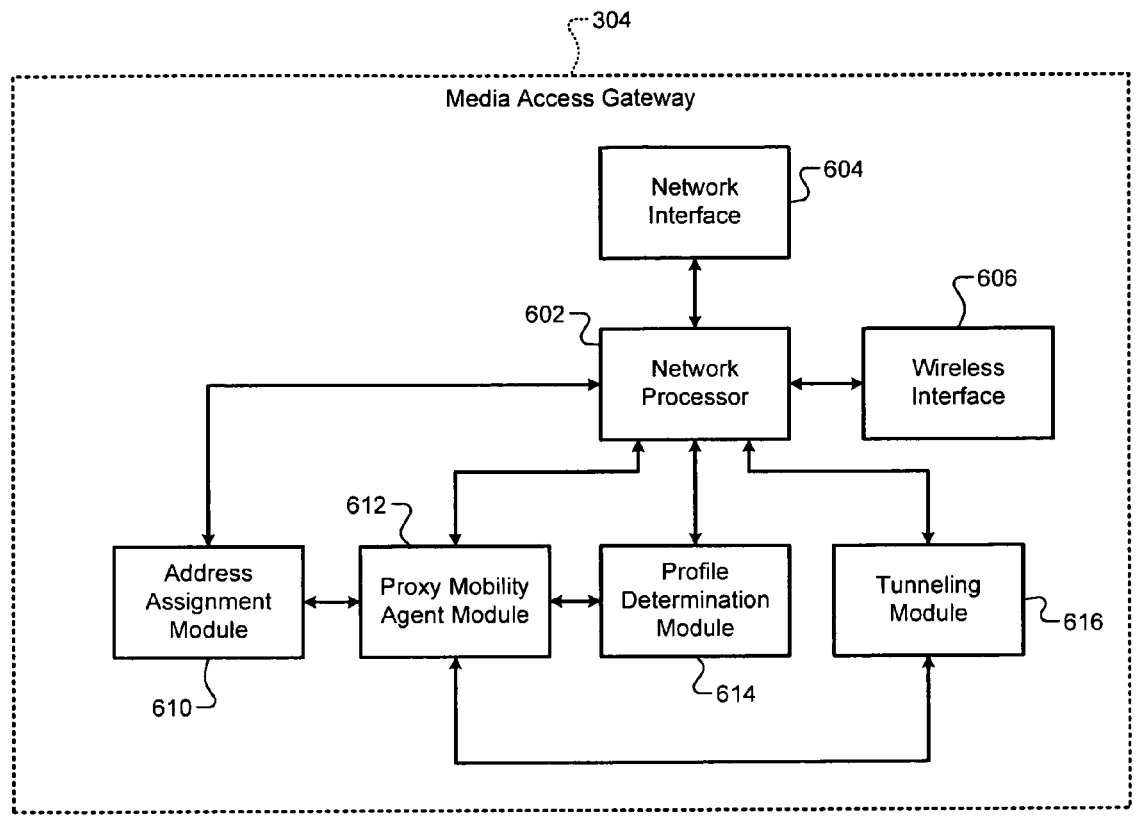
FIG. 19 is a functional block diagram of an exemplary media access gateway (MAG) according to the principles of the present disclosure.

Referring now to FIG. 19, a functional block diagram of an exemplary implementation of the MAG 304 is presented. The MAG 304 includes a network processor 602 that communicates with one or more PDNs via a network interface 604. A wireless interface 606 communicates with a wireless terminal. In various implementations, the wireless interface 606 may support a single access type, such as Wi-Fi (IEEE 802.11) or a third generation partnership project (3GPP) interface.

The MAG 304 also includes an address assignment module 610, a proxy mobility agent (PMA) module 612, a profile determination module 614, and a tunneling module 616, which communicate with the network processor 602. The address assignment module 610 processes DHCP requests and router solicitation messages. The address assignment module 610 may extract APN information from extended DHCP requests and extended router solicitation messages. This APN information is provided to the PMA module 612.

The profile determination module 614 obtains the profile corresponding to the wireless terminal connected to the wireless interface 606. For example only, the profile may be obtained via the network interface 604 from a home subscriber server (HSS). The profile determination module 614 extracts APN information from the profile and passes the information to the PMA module 612.

The PMA module 612 determines a selected set of APNs based on APNs received from the address assignment module 610 and the profile determination module 614. The PMA module 612 may refine and/or expand this selected set based on local policy information and/or agreements with a home network of the wireless terminal.

The PMA module 612 establishes proxy mobility with LMAs corresponding to the selected set of APNs. The addresses for these LMAs may be provided by the profile determination module 614. The PMA module 612 establishes tunnels to each of the LMAs using the tunneling module 616. The tunneling module 616 encapsulates packets received via the wireless interface 606 for transmission to the LMAs. The tunneling module 616 also decapsulates packets received from the network interface 604 for broadcast to the wireless terminal via the wireless interface 606.

The PMA module 612 provides address information corresponding to the selected APNs to the address assignment module 610. In addition, the address assignment module 610 may receive address information stored in the profile from the profile determination module 614. The address assignment module 610 generates DHCP reply and/or router advertisement messages including IP address information and APN information.

The APN information identifies the IP address to which the APN address corresponds. The address assignment module 610 may also determine full IP addresses based on address prefix information. The address assignment module 610 may include full addresses and/or address prefixes in the extended DHCP replies and extended router advertisement messages.

Figure 20A:
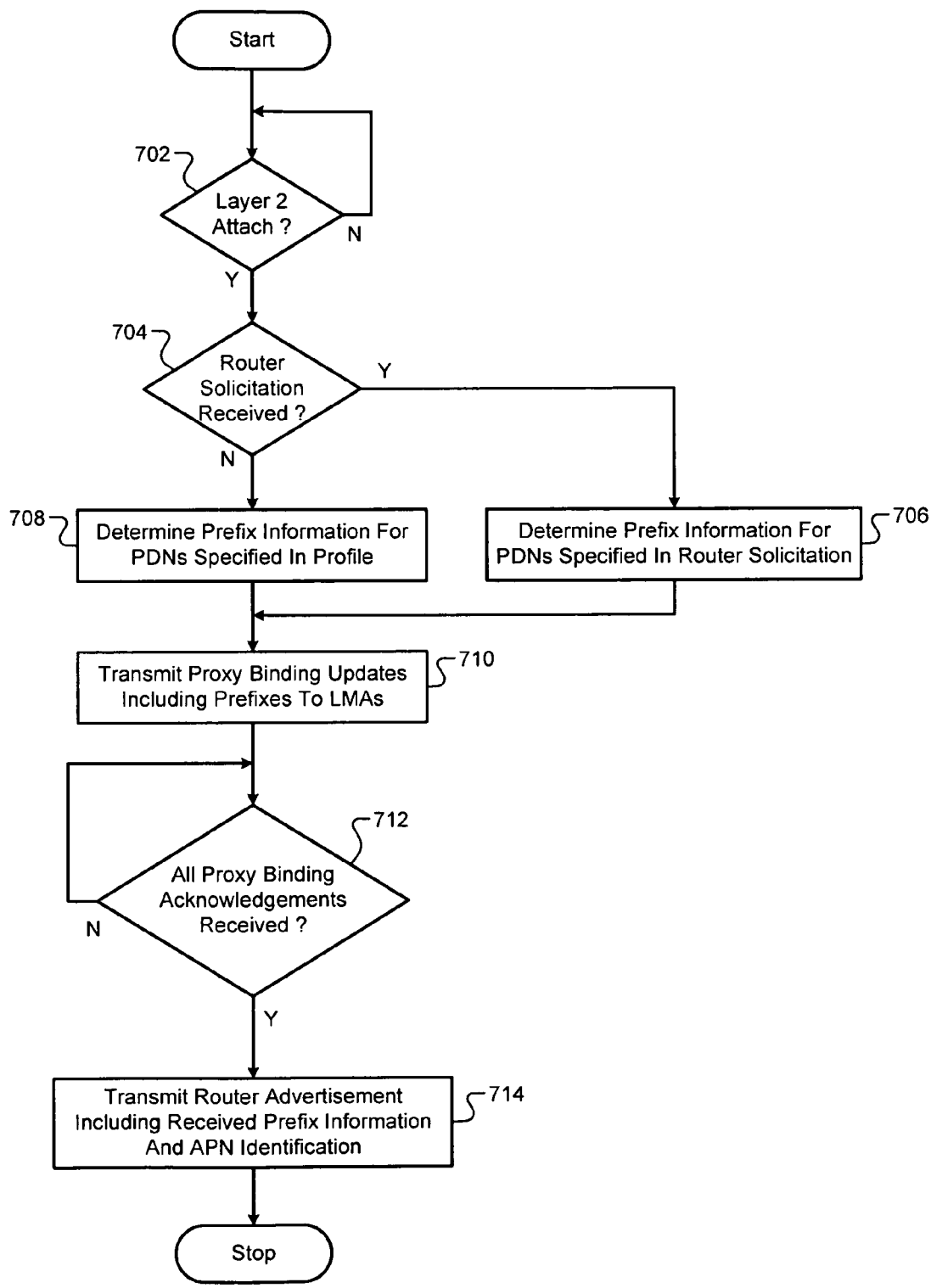
FIGS. 20A-20D depict exemplary steps performed by the MAG according to the principles of the present disclosure.

Referring now to FIGS. 20A-20D, flowcharts depict exemplary operation of the MAG 304 of FIG. 19. FIGS. 20A, 20B, 20C, and 20D may correspond to the message flows shown in FIGS. 13A, 13B, 15A, and 15B, respectively. Referring first to FIG. 20A, control begins in step 702. Control waits in step 702 for a wireless terminal to establish layer 2 connectivity with the MAG. Once layer 2 connectivity is established, control transfers to step 704.

In step 704, control determines whether a router solicitation message has been received. If so, control transfers to step 706; otherwise, control transfers to step 708. In various implementations, control may remain in step 704 for a predetermined period of time to see if a router solicitation message will be received.

In step 708, no router solicitation message has been received and therefore prefix information is determined based on PDNs specified in the profile of the wireless terminal. Control then continues in step 710. In step 706, control determines prefix information for PDNs specified by the APNs contained in the router solicitation message. In various implementations, the set of APNs specified by the router solicitation message may be modified based on the profile of the wireless terminal and the local settings of the MAG. Control continues in step 710.

In step 710, control transmits proxy binding updates to LMAs corresponding to the selected PDNs. The proxy binding updates may include the corresponding prefixes. These prefixes uniquely identify the wireless terminal to the LMAs. Control continues in step 712, where control waits for proxy binding acknowledgements to be received from all of the LMAs to which proxy binding updates were sent. Once all proxy binding acknowledgements have been received, control transfers to step 714.

In step 714, control transmits a router advertisement message to the wireless terminal including received prefix information. The address prefix information is identified by the APN to which it corresponds. In this way, the wireless terminal knows which address prefix corresponds to which PDN. Control then ends. In various implementations, the router advertisement may be transmitted prior to receiving all proxy binding acknowledgements. For example, the router advertisement may be sent after each proxy binding acknowledgement is received to reduce latency if one of the proxy binding acknowledgements is delayed.

Figure 20B:
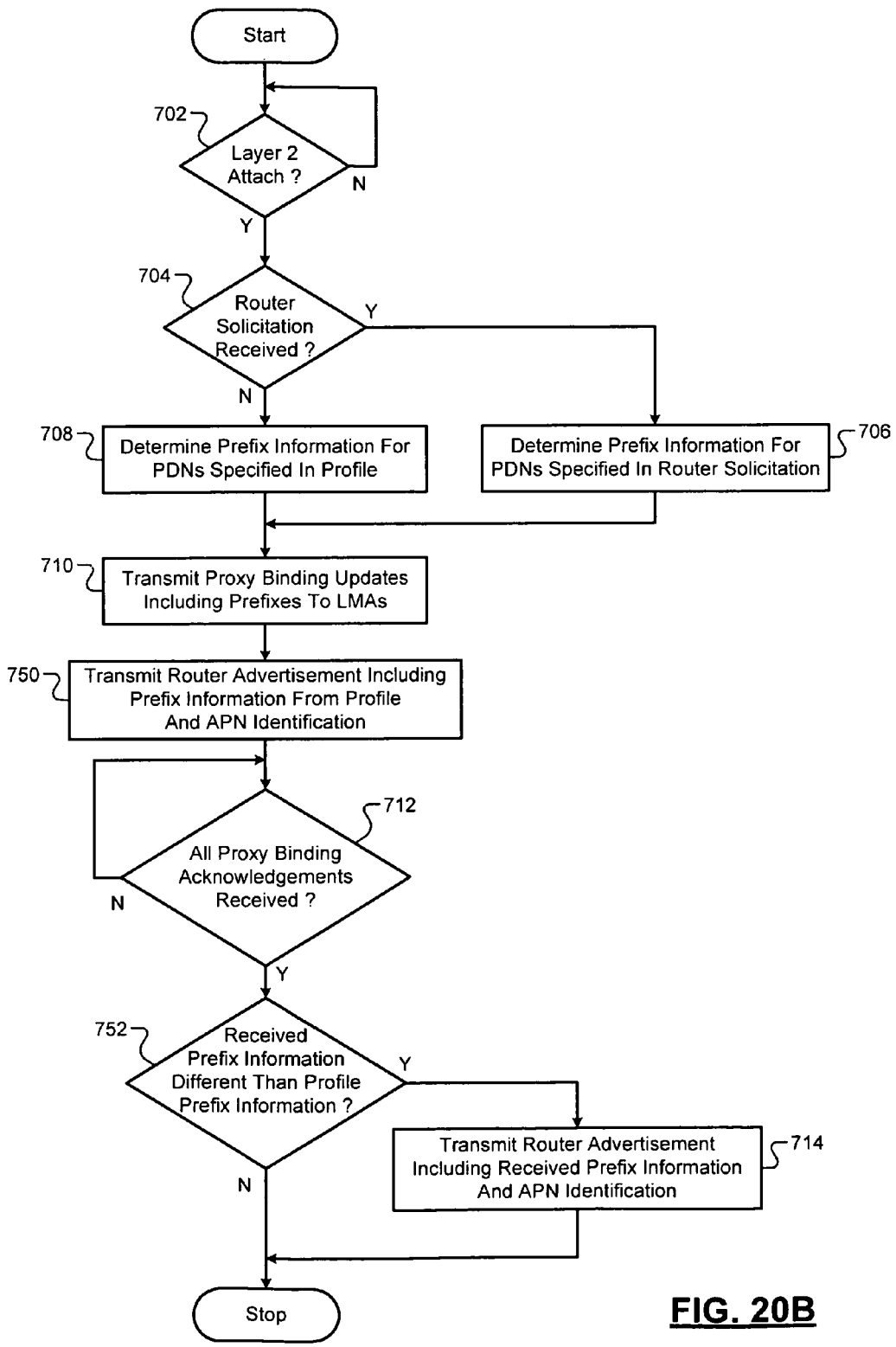

Referring now to FIG. 20B, a situation is shown where control may transmit a router advertisement message before any proxy binding acknowledgements are received. Control may be similar to that of FIG. 20A. However, after step 710, control transfers to step 750. In step 750, control transmits the router advertisement message including address information based on the profile. The address information is supplemented by identification of the APN to which each address belongs.

Control then continues in step 712. After all proxy binding acknowledgements are received in step 712, control transfers to step 752. In step 752, control determines whether the address information received in the proxy binding acknowledgements is different than the address information determined from the profile. If so, control transfers to step 714; otherwise, the wireless terminal has already received the correct address information and control ends.

Figure 20C:
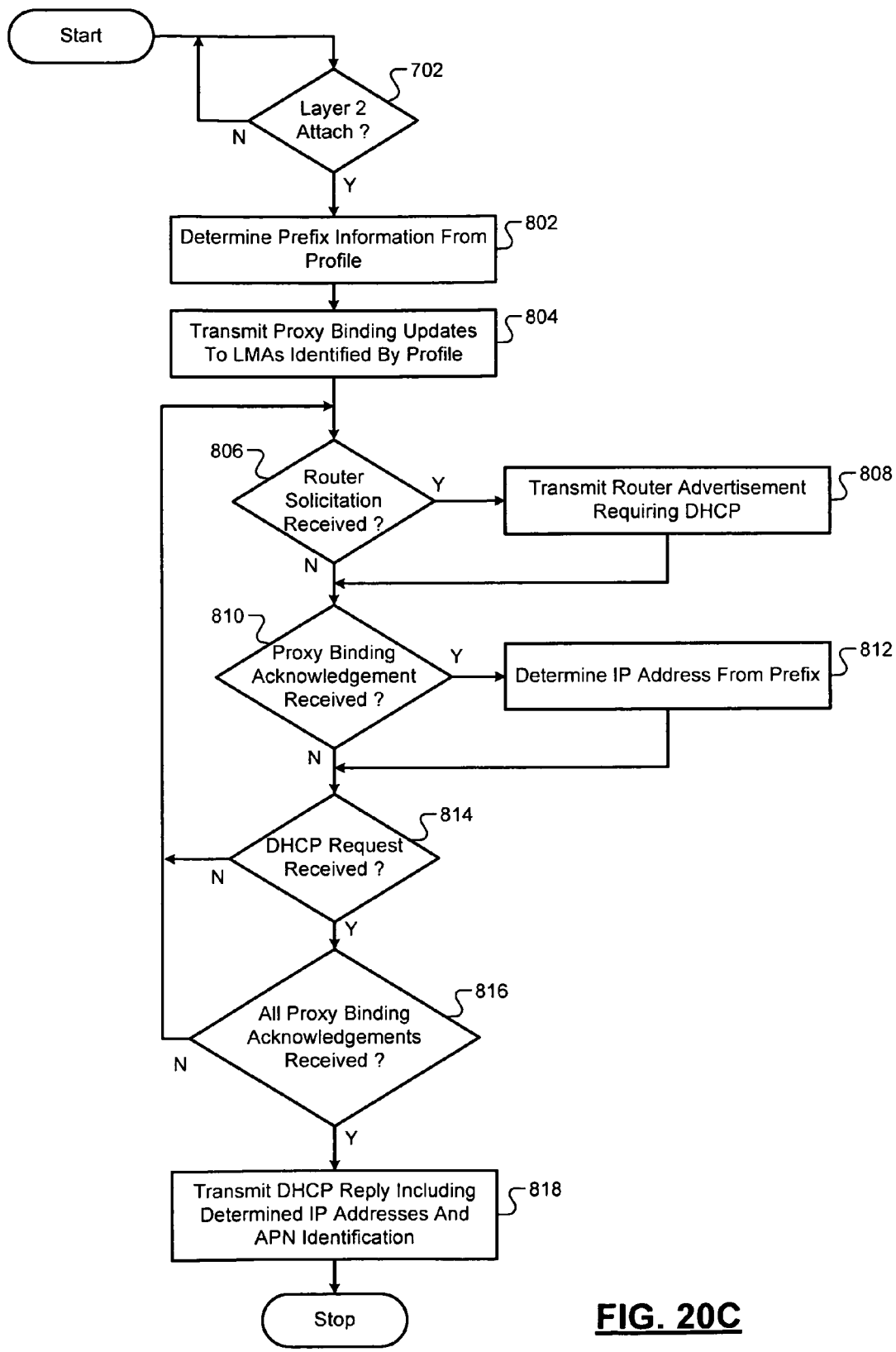

Referring now to FIG. 20C, control begins in step 702. Once layer 2 communication has been established with a wireless terminal, control transfers to step 802. In step 802, control accesses the profile corresponding to the wireless terminal that is attached to the MAG. Control determines any associated prefix information from the profile.

Control continues in step 804, where control transmits proxy binding updates to LMAs identified by the profile. These proxy binding updates include prefix information or other identifiers that uniquely identify the wireless terminal. In various implementations, the control may wait to send proxy binding updates until a router solicitation message or a DHCP request has been received indicating the APN preferences of the wireless terminal.

Control continues in step 806, where control determines whether a router solicitation message has been received. If so, control transfers to step 808; otherwise, control transfers to step 810. In step 808, control transmits a router advertisement message indicating that DHCP is required. For example, FIG. 20C may apply in situations where stateless address autoconfiguration is not possible or not allowed. Control then continues in step 810.

In step 810, control determines whether a proxy binding acknowledgement has been received. If so, control transfers to step 812; otherwise, control transfers to step 814. In step 812, control determines an IP address based on the prefix received in the proxy binding acknowledgement. Control then continues in step 814.

In step 814, control determines whether a DHCP request has been received. If so, control transfers to step 816; otherwise, control returns to step 806. In step 816, a DHCP request has been received, and so control determines whether proxy binding acknowledgements have been received from all LMAs. If so, control transfers to step 818; otherwise, control returns to step 806 to await the remaining proxy binding acknowledgements. Step 814 may be implemented to ensure that a DHCP reply is not sent prior to a DHCP request being received. In step 818, a DHCP reply is transmitted including addresses determined from received prefixes as well as identifying APN information. Control then ends.

Figure 20D:
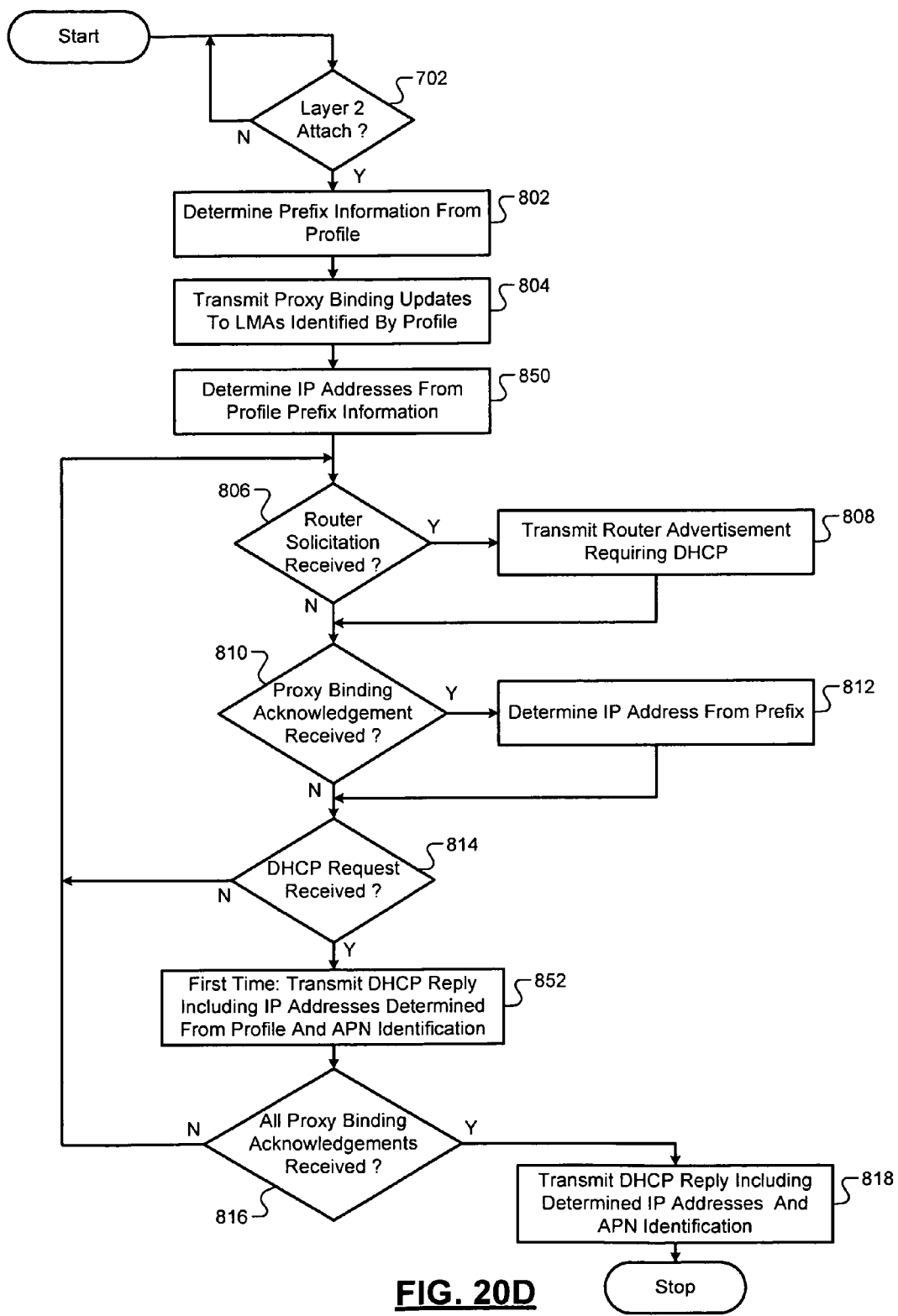

Referring now to FIG. 20D, operation may be similar to that of FIG. 20C. However, after step 804, control continues in step 850. In step 850, control determines IP addresses from prefix information obtained from the profile. These IP addresses will be sent to the wireless terminal in step 852. Control then continues in step 806.

Step 852 is positioned between steps 814 and 816. The first time that step 852 is encountered, control transmits a DHCP reply including the IP addresses determined from the profile prefix information in step 850. The DHCP reply also includes identifying APN information. Control may still transmit a DHCP reply in step 818 once all proxy binding acknowledgements have been received if address information received from the LMAs is different than information already sent.

Figure 21:
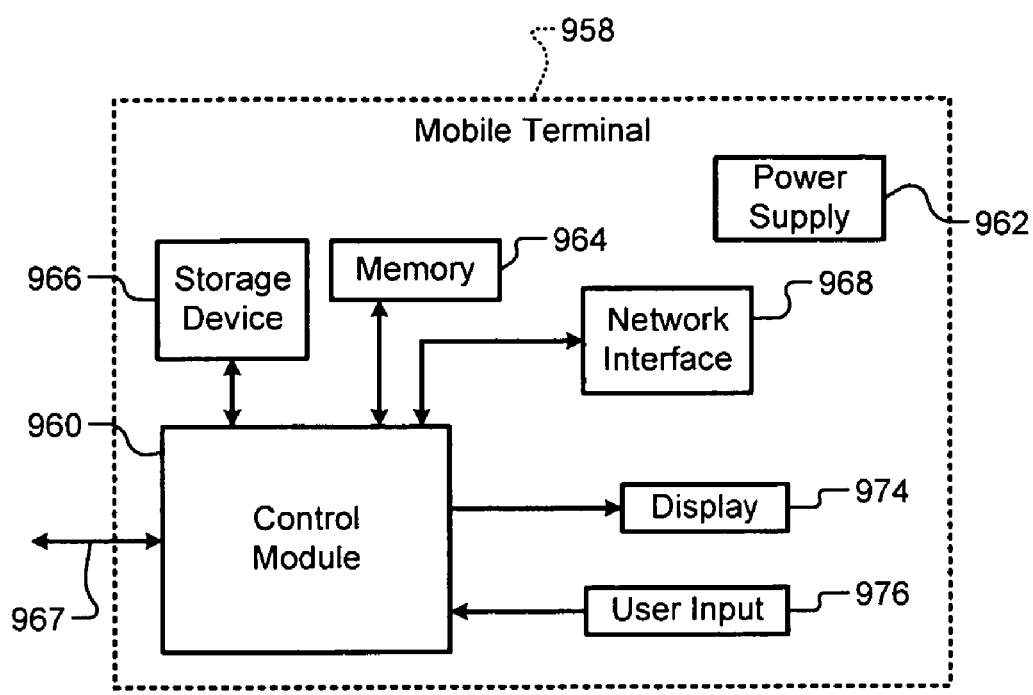
FIG. 21 is a functional block diagram of a mobile terminal.

Referring now to FIG. 21, the teachings of the disclosure can be implemented in a control module 960 of a mobile terminal 958. The mobile terminal 958 includes the control module 960, a power supply 962, memory 964, a storage device 966, and a wireless network interface 967. The mobile terminal 958 may optionally include a network interface 968, a microphone, an audio output such as a speaker and/or output jack, a display 974, and a user input device 976 such as a keypad and/or pointing device. If the network interface 968 includes a wireless local area network interface, an antenna (not shown) may be included.

The control module 960 may receive input signals from the wireless network interface 967, the network interface 968, the microphone, and/or the user input device 976. The control module 960 may process signals, including encoding, decoding, filtering, and/or formatting, and generate output signals. The output signals may be communicated to one or more of memory 964, the storage device 966, the wireless network interface 967, the network interface 968, and the audio output.

Memory 964 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 966 may include an optical storage drive, such as a DVD drive, and/or a hard disk drive (HDD). The power supply 962 provides power to the components of the mobile terminal 958. The teachings of the disclosure can be implemented similarly in other devices such as a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A media access gateway comprising:
    a wireless network interface that establishes a wireless link with a wireless terminal;
    an address assignment module that transmits N address assignment messages to the wireless terminal, wherein the N address assignment messages include a plurality of address components and associate the plurality of address components with a plurality of packet data networks, where N is an integer greater than zero;
    a proxy mobility agent (PMA) module that determines the plurality of packet data networks; and
    a profile determination module that retrieves a profile corresponding to the wireless terminal,
    wherein the PMA module determines the plurality of packet data networks based on packet data network identifiers in the profile.

2. The media access gateway of claim 1 wherein the address assignment module selectively permits the wireless terminal to perform stateless address autoconfiguration and wherein the N address assignment messages comprise a router advertisement message.

3. The media access gateway of claim 2 wherein the plurality of address components each comprise an internet protocol version 6 address prefix.

4. The media access gateway of claim 1 wherein the N address assignment messages each comprise a dynamic host configuration protocol (DHCP) reply.

5. The media access gateway of claim 4 wherein the plurality of address components each comprise one of an internet protocol (IP) version 4 address, an version 6 (IPv6) address, and an IPv6 address prefix.

6. The media access gateway of claim 1 wherein the N address assignment messages include a respective identifier for each of the plurality of packet data networks.

7. The media access gateway of claim 1 wherein the N address assignment messages include, the address components in an order, and wherein the wireless network interface one of (i) transmits a specification of the order to the wireless terminal and (ii) receives a specification of the order from the wireless terminal.

8. The media access gateway of claim 1 wherein the PMA module transmits proxy binding updates to a plurality of local mobility agents corresponding to the plurality of packet data networks.

9. The media access gateway of claim 8 wherein the PMA module receives proxy binding acknowledgements from the plurality of local mobility agents, and wherein the address assignment module determines the plurality of address components based on address information in the proxy binding acknowledgements.

10. The media access gateway of claim 1 wherein the address assignment module receives an address request message from the wireless terminal, wherein the address request message includes desired packet data network identifiers.

11. The media access gateway of claim 10 wherein the PMA module determines the plurality or packet data networks based on the desired packet data network identifiers.

12. The media access gateway of claim 10 wherein the address request message comprises at least one of a dynamic host configuration protocol (DHCP) request and a router solicitation message.

13. The media access gateway of claim 1 wherein the profile determination module retrieves the profile from a home subscriber server.

14. A method comprising:
 establishing a wireless link with a wireless terminal;
 transmitting N address assignment messages to the wireless terminal, wherein the N address assignment messages include a plurality of address components and associate the plurality of address components with a plurality of packet data networks, where N is an integer greater than zero;
 retrieving a profile corresponding to the wireless terminal; and
 determining the plurality of packet data networks based on packet data network identifiers in the profile.

15. The method of claim 14 further comprising selectively permitting the wireless terminal to perform stateless address autoconfiguration, wherein the N address assignment messages comprise a router advertisement message.

16. The method of claim 15 wherein the plurality of address components each comprise an internet protocol version 6 address prefix.

17. The method of claim 14 wherein the N address assignment messages each comprise a dynamic host configuration protocol (DHCP) reply.

18. The method of claim 17 wherein the plurality of address components each comprise one of an internet protocol (IP) version 4 address, an IP version 6 (IPv6) address, and an IPv6 address prefix.

19. The method of claim 14 wherein the N address assignment messages include a respective identifier for each of the plurality of packet data networks.

20. The method of claim 14 wherein the N address assignment messages include the address components in an order, and further comprising one of (i) transmitting a specification of the order to the wireless terminal and (ii) receiving a specification of the order from the wireless terminal.

21. The method of claim 14 further comprising transmitting proxy binding updates to a plurality of local mobility agents corresponding to the plurality of packet data networks.

22. The method of claim 21 further comprising:
 receiving proxy binding acknowledgements from the plurality of local mobility agents; and
 determining the plurality of address components based on address information in the proxy binding acknowledgements.

23. The method of claim 14 further comprising receiving an address request message from the wireless terminal, wherein the address request message includes desired packet data network identifiers.

24. The method of claim 23 further comprising determining the plurality of packet data networks based on the desired packet data network identifiers.

25. The method of claim 23 wherein the address request message comprises at least one of a dynamic host configuration protocol (DHCP) request and a router solicitation message.

26. The method of claim 14 further comprising retrieving the profile from a home subscriber server.

27. A method comprising:
 establishing a wireless link with a wireless terminal;
 transmitting N address assignment messages to the wireless terminal, wherein the N address assignment messages include a plurality of address components and associate the plurality of address components with a plurality of packet data networks, where N is an integer greater than zero;
 receiving an address request message from the wireless terminal, wherein the address request message includes desired packet data network identifiers; and
 determining the plurality of packet data networks based on the desired packet data network identifiers.

* * * * *